US012591352B2

(12) United States Patent
Kawano

(10) Patent No.: US 12,591,352 B2
(45) Date of Patent: Mar. 31, 2026

(54) INFORMATION PROCESSING SYSTEM, INFORMATION PROCESSING METHOD, AND NON-TRANSITORY COMPUTER READABLE MEDIUM

(71) Applicant: FUJIFILM Business Innovation Corp., Tokyo (JP)

(72) Inventor: Yusuke Kawano, Yokohama (JP)

(73) Assignee: FUJIFILM BUSINESS INNOVATION CORP., Tokyo (JP)

( * ) Notice: Subject to any disclaimer, the term of this patent is extended or adjusted under 35 U.S.C. 154(b) by 747 days.

(21) Appl. No.: 17/865,700

(22) Filed: Jul. 15, 2022

(65) Prior Publication Data

US 2023/0315257 A1     Oct. 5, 2023

(30) Foreign Application Priority Data

Mar. 29, 2022     (JP) ................................. 2022-053687

(51) Int. Cl.
*G06F 3/048* (2013.01)
*G06F 3/0482* (2013.01)
*G06F 3/04845* (2022.01)
*G06F 16/16* (2019.01)
*G06F 3/04817* (2022.01)

(52) U.S. Cl.
CPC ........ *G06F 3/0482* (2013.01); *G06F 3/04845* (2013.01); *G06F 16/168* (2019.01); *G06F 3/04817* (2013.01)

(58) Field of Classification Search
None
See application file for complete search history.

(56) References Cited

U.S. PATENT DOCUMENTS

| 7,574,674 | B2 | 8/2009 | Schwartz et al. | |
| 2011/0119256 | A1* | 5/2011 | Matsuda | G06F 16/587 |
| | | | | 707/E17.014 |
| 2014/0304658 | A1 | 10/2014 | Larkina et al. | |
| 2015/0106714 | A1* | 4/2015 | Jeong | G06F 3/04812 |
| | | | | 715/781 |
| 2019/0065030 | A1* | 2/2019 | Kang | G06F 3/0488 |

(Continued)

FOREIGN PATENT DOCUMENTS

| JP | 2007-180638 A | 7/2007 |
| JP | 2008-077210 A | 4/2008 |

OTHER PUBLICATIONS

May 31, 2023 Extended Search Report issued in European Patent Application No. 22192701.5.

(Continued)

*Primary Examiner* — Thanh T Vu
(74) *Attorney, Agent, or Firm* — OLIFF PLC.

(57) ABSTRACT

An information processing system includes a processor configured to: cause an enlarged image to be displayed if a file image is selected, the file image being an image which is displayed on a display and which corresponds to a file, and the enlarged image being an image which corresponds to the file image and which has a larger display size than the file image; and cause a file-corresponding image to be displayed in a location different from a display location of the file image and a display location of the enlarged image if the file image displayed on the display is selected, the file-corresponding image being an image that corresponds to the file image.

19 Claims, 16 Drawing Sheets

(56) References Cited

U.S. PATENT DOCUMENTS

| | | | |
|---|---|---|---|
| 2019/0121879 A1* | 4/2019 | Canelis | G06F 3/04845 |
| 2021/0405850 A1* | 12/2021 | Schneiter | G06F 8/38 |
| 2022/0019635 A1* | 1/2022 | Li | G06F 16/9535 |

OTHER PUBLICATIONS

Nov. 18, 2025 Office Action issued in Japanese Patent Application No. 2022-053687.

* cited by examiner

FIG. 10

| FILE IDENTIFIER | FILE NAME | ICON POSITION | THUMBNAIL IMAGE PATH | ENLARGED IMAGE PATH | FILE PATH | ⋮ |
|---|---|---|---|---|---|---|
| 1001 | Sample1 | (120, 80) | /root/1001/small.jpeg | /root/1001/large.jpeg | /root/1001/origin.pdf | ⋮ |
| 1002 | Sample2 | (180, 130) | /root/1002/small.peg | /root/1002/large.jpeg | /root/1002/origin.pdf | ⋮ |
| 1003 | Sample3 | (60, 90) | /root/1003/small.peg | /root/1003/large.jpeg | /root/1003/origin.pdf | ⋮ |
| ⋮ | ⋮ | | ⋮ | ⋮ | ⋮ | ⋮ |

1

INFORMATION PROCESSING SYSTEM, INFORMATION PROCESSING METHOD, AND NON-TRANSITORY COMPUTER READABLE MEDIUM

CROSS-REFERENCE TO RELATED APPLICATIONS

This application is based on and claims priority under 35 USC 119 from Japanese Patent Application No. 2022-053687 filed Mar. 29, 2022.

BACKGROUND

(i) Technical Field

The present disclosure relates to an information processing system, an information processing method, and a non-transitory computer readable medium.

(ii) Related Art

Japanese Unexamined Patent Application Publication No. 2007-180638 discloses an imaging device that "is provided with a randomly accessible recording medium, includes a graphic circuit capable of displaying a navigation image in which thumbnail images are arranged in a list, the graphic circuit having a function for superimposing the navigation image onto a moving image, and presents a pop-up display of a moving image of the scene in a selected thumbnail image as an enlarged image on the navigation screen."

SUMMARY

When a file image is selected, for example, if an enlarged image is made to be displayed, that is, if an image which corresponds to the selected file image and which has a larger display size than the file image is displayed, the user obtains information about the file image more easily. Incidentally, it is also anticipated that the file image may be obscured due to the display of the enlarged image, and in this case, the user may have difficulty grasping which file image the displayed enlarged image corresponds to.

Aspects of non-limiting embodiments of the present disclosure relate to enabling the user to grasp which file image a displayed enlarged image corresponds to, even if the file image is obscured due to the display of the enlarged image.

Aspects of certain non-limiting embodiments of the present disclosure address the above advantages and/or other advantages not described above. However, aspects of the non-limiting embodiments are not required to address the advantages described above, and aspects of the non-limiting embodiments of the present disclosure may not address advantages described above.

According to an aspect of the present disclosure, there is provided an information processing system including a processor configured to: cause an enlarged image to be displayed if a file image is selected, the file image being an image which is displayed on a display and which correspond to a file, and the enlarged image being an image which corresponds to the file image and which has a larger display size than the file image; and cause a file-corresponding image to be displayed in a location different from a display location of the file image and a display location of the enlarged image if the file image displayed on the display is selected, the file-corresponding image being an image that corresponds to the file image.

BRIEF DESCRIPTION OF THE DRAWINGS

An exemplary embodiment of the present disclosure will be described in detail based on the following figures, wherein:

FIG. 10 is a diagram illustrating an example of information managed by an information processing system;

DETAILED DESCRIPTION

Hereinafter, an exemplary embodiment of the present disclosure will be described in detail and with reference to the attached drawings.

Figure 1:
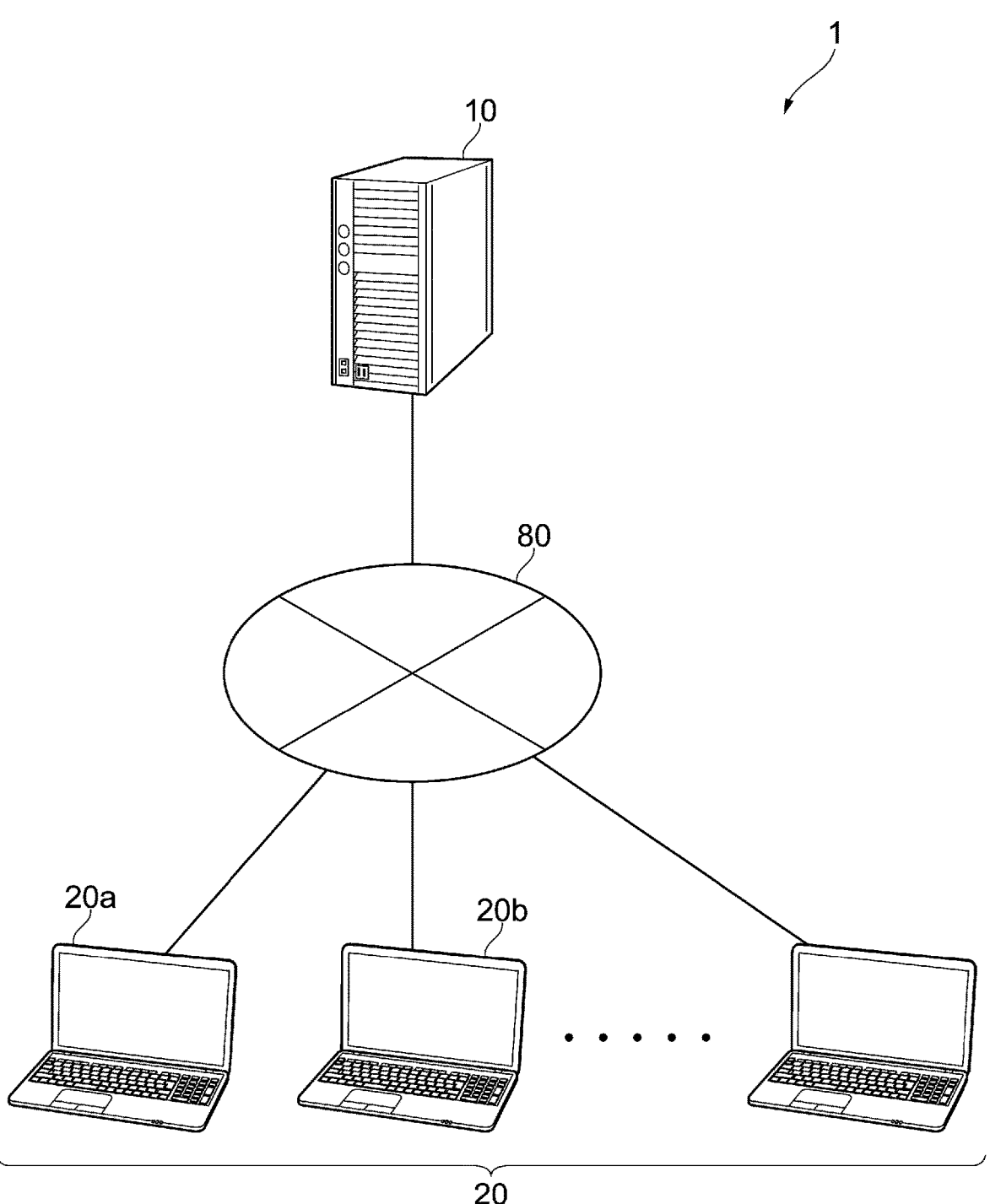
FIG. 1 is a diagram illustrating an exemplary overall configuration of an information processing system.

FIG. 1 is a diagram illustrating an overall configuration example of an information processing system 1 to which the exemplary embodiment is applied.

The information processing system 1 according to the exemplary embodiment is configured by connecting, over a communication network 80, a server device 10 that manages files and terminal devices 20 (20a, 20b, and so on) used by users for viewing files.

The communication network 80 is a network such as the Internet, for example, and is used to communicate information between the server device 10 and the terminal devices 20. In the information processing system 1 according to the exemplary embodiment, it is assumed that files uploaded to the server device 10 are viewed and edited on the terminal devices 20.

Note that in the exemplary embodiment, a "file" refers to an electronic file stored in the server device 10 or the like.

A file may include an image in addition to text, or an image only without text. Moreover, a file may not only include document data or image data, but also information to be used when converting document data into an image and attribute information such as the file modification date and time, a paper size, a number of pages, and keywords inside the file.

The server device 10 is a device for managing files uploaded from the terminal devices 20. The files managed by the server device 10 are shared by multiple users and may be edited by one or multiple users.

The server device 10 is realized by a computer device, for example. The server device 10 may be configured as a single computer or may be realized through distributed processing performed by multiple computers.

The terminal device 20 is a device for viewing and editing files managed in the server device 10.

The terminal device 20 includes a display that displays images corresponding to files. The terminal device 20 is provided with a computer device. Forms of the terminal device 20 include a desktop personal computer (PC), a laptop PC, a tablet information terminal, a smartphone, and a game console, for example.

A hardware configuration of the server device 10 will be described.

Figure 2:
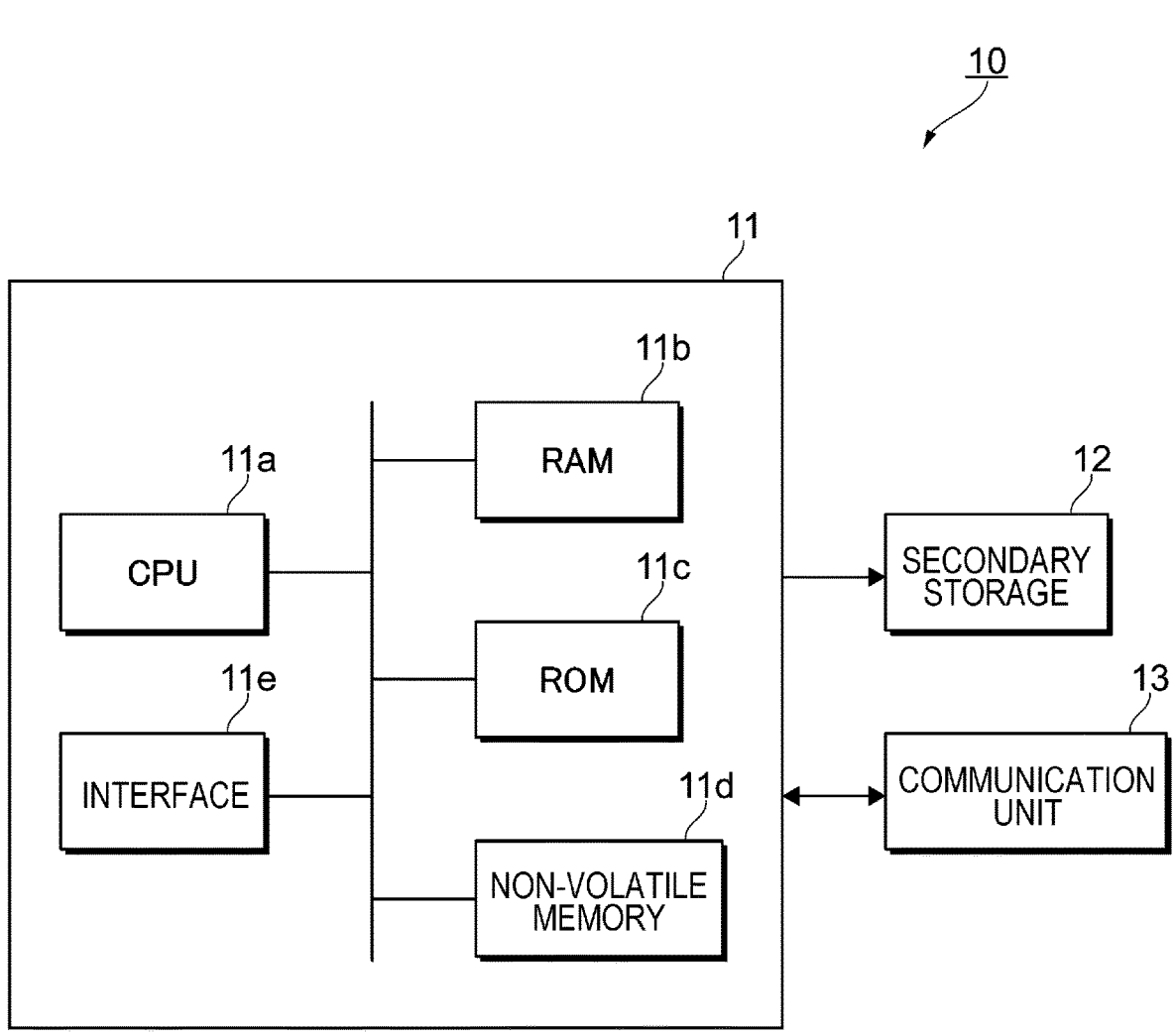
FIG. 2 is a block diagram illustrating an example of a hardware configuration of a server device.

FIG. 2 is a block diagram illustrating an example of a hardware configuration of the server device 10 according to the exemplary embodiment.

The server device 10 includes a computational processing unit 11 that executes digital computational processing according to a program for managing files, secondary storage 12 in which files and the like are recorded, and a communication unit 13 that transmits and receives information over the communication network 80 (see FIG. 1).

The secondary storage 12 is realized by an existing information storage device such as a hard disk drive (HDD), semiconductor memory, or magnetic tape, for example.

The computational processing unit 11 is provided with CPU 11*a* as one example of a processor. The CPU 11*a* controls the server device 10 as a whole.

The computational processing unit 11 is also provided with RAM 11*b* used as a working memory of the CPU 11*a* and ROM 11*c* that stores data such as programs to be executed by the CPU 11*a*.

In addition, the computational processing unit 11 is provided with non-volatile memory 11*d* which is rewritable and capable of retaining data even if the power supply is cut off, and an interface 11*e* that controls each unit such as the communication unit 13 connected to the computational processing unit 11.

The non-volatile memory 11*d* is configured using battery-backed SRAM or flash memory, for example, and the non-volatile memory 11*d* stores data such as correspondence information that associates information about files and files to each other.

Also, in addition to storing information related to files and the like, the secondary storage 12 also stores programs to be executed by the computational processing unit 11.

In the exemplary embodiment, the processes of the server device 10 are executed by causing the computational processing unit 11 to load a program stored in the secondary storage 12. Note that the computational processing unit 11, the secondary storage 12, and the communication unit 13 are connected through a bus or signal lines.

The server device 10 executes processes such as acquiring a new file, performing file extraction, associating files with each other, and applying the updated content of a file in response to requests and the like from the terminal devices 20.

Additionally, the server device 10 provides various information such as files, the results of search processes, and update information to the terminal devices 20 in response to requests and the like from the terminal devices 20.

In the exemplary embodiment, the secondary storage 12 stores information related to files and the like. Also, the communication unit 13 receives requests and the like from the terminal devices 20 and transmits requested files and the like.

A program to be executed by the CPU 11*a* provided in the server device 10 may be provided to the server device 10 in a recorded state on a computer-readable recording medium, such as a magnetic recording medium (such as magnetic tape or a magnetic disk), an optical recording medium (such as an optical disc), a magneto-optical recording medium, or semiconductor memory. A program to be executed by the CPU 11*a* may also be provided to the server device 10 by using a means of communication such as the Internet.

Next, a hardware configuration of the terminal device 20 will be described.

Figure 3:
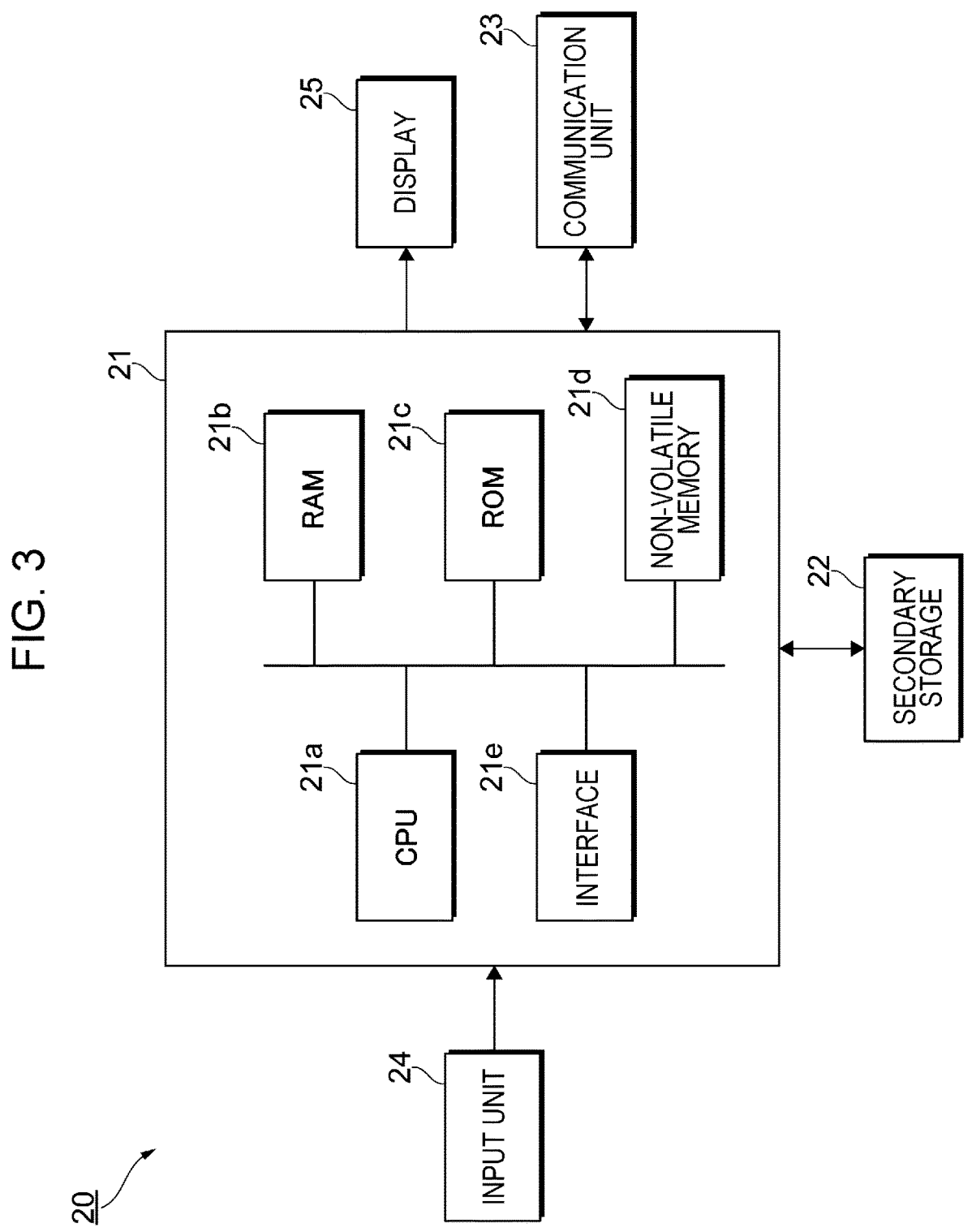
FIG. 3 is a block diagram illustrating an example of a hardware configuration of a terminal device.

FIG. 3 is a block diagram illustrating an example of a hardware configuration of the terminal device 20.

Each terminal device 20 according to the exemplary embodiment includes a computational processing unit 21 that executes processing for displaying images according to a program, secondary storage 22 in which information related to files and the like is recorded, and a communication unit 23 that transmits and receives information over the communication network 80 (see FIG. 1).

Also, each terminal device 20 includes an input unit 24 that receives input operations from a user and a display 25 that displays images, text information, and the like to a user. The display 25 may be a liquid crystal display (LCD) panel or an organic light-emitting diode (OLED) display panel, for example.

The secondary storage 22 is realized by an existing information storage device such as a hard disk drive (HDD), semiconductor memory, or magnetic tape, for example.

The computational processing unit 21 is provided with a CPU 21*a* as one example of a processor. The CPU 21*a* controls the terminal device 20 as a whole.

The computational processing unit 21 is also provided with RAM 21*b* used as a working memory of the CPU 21*a* and ROM 21*c* that stores data such as programs to be executed by the CPU 21*a*.

In addition, the computational processing unit 21 is provided with non-volatile memory 21*d* which is rewritable and capable of retaining data even if the power supply is cut off, and an interface 21*e* that controls each unit such as the communication unit 23 connected to the computational processing unit 21.

The non-volatile memory 21*d* is configured using battery-backed SRAM or flash memory, for example, and stores data such as files and update information.

Also, in addition to storing information related to files and the like, the secondary storage 22 also stores programs to be executed by the computational processing unit 21. The processes of the terminal device 20 are executed by causing the computational processing unit 21 to load a program stored in the secondary storage 22.

Note that the computational processing unit 21, the secondary storage 22, and the communication unit 23 are connected through a bus or signal lines.

The input unit 24 is a pointing device or the like that the user operates when inputting information.

For example, in the case where the input unit 24 is a mouse, the user performs operations for moving a cursor and click operations to thereby specify a position on display screen displayed on the display 25, specify an image displayed on the display 25, and move the specified image.

Also, in the case where the input unit 24 is a touch panel, the user performs operations that involve touching the touch panel with a finger or the like and operations that involve moving the finger while touching the touch panel. With this arrangement, the user is able to specify a position on display screen displayed on the display 25, specify an image displayed on the display 25, and move the specified image.

Note that a touch panel may be provided in the terminal device 20 in some cases, and in such cases, the input unit 24 and the display 25 are provided as a unified component.

Additionally, besides the pointing device or the like described above, the input unit 24 may also be a keyboard used to perform input operations via keys.

A program to be executed by the CPU 21*a* provided in the terminal device 20 may be provided to the terminal device 20 in a recorded state on a computer-readable recording medium, such as a magnetic recording medium (such as magnetic tape or a magnetic disk), an optical recording medium (such as an optical disc), a magneto-optical recording medium, or semiconductor memory. A program to be executed by the CPU 21*a* may also be provided to the terminal device 20 by using a means of communication such as the Internet.

In the exemplary embodiment, the term "processor" refers to hardware in a broad sense. Examples of the processor include general processors (e.g., CPU: Central Processing Unit), dedicated processors (e.g., GPU: Graphics Processing Unit, ASIC: Application Integrated Circuit, FPGA: Field Programmable Gate Array, and programmable logic device).

Also, the term "processor" is broad enough to encompass one processor or plural processors in collaboration which are located physically apart from each other but may work cooperatively. The order of operations of the processor is not limited to one described in the exemplary embodiment, and may be changed.

<Display on Display 25>

Next, the display on the display 25 provided in the terminal device 20 will be described using FIG. 4 (a diagram illustrating a display example on a display).

In the exemplary embodiment, information to be used to control the display on the display 25 provided in the terminal device 20 is generated by the CPU 11*a* (see FIG. 2) provided as an example of a processor in the server device 10. Thereafter, the terminal device 20 controls the display according to the information. With this arrangement, the various screens described hereinafter are displayed on the display 25 of the terminal device 20.

Note that the information to be used to control the display on the display 25 of the terminal device 20 may also be generated by the terminal device 20 rather than the server device 10. Moreover, one portion of the information to be used for control may be generated by the server device 10 and another portion may be generated by the terminal device 20.

Figure 4:
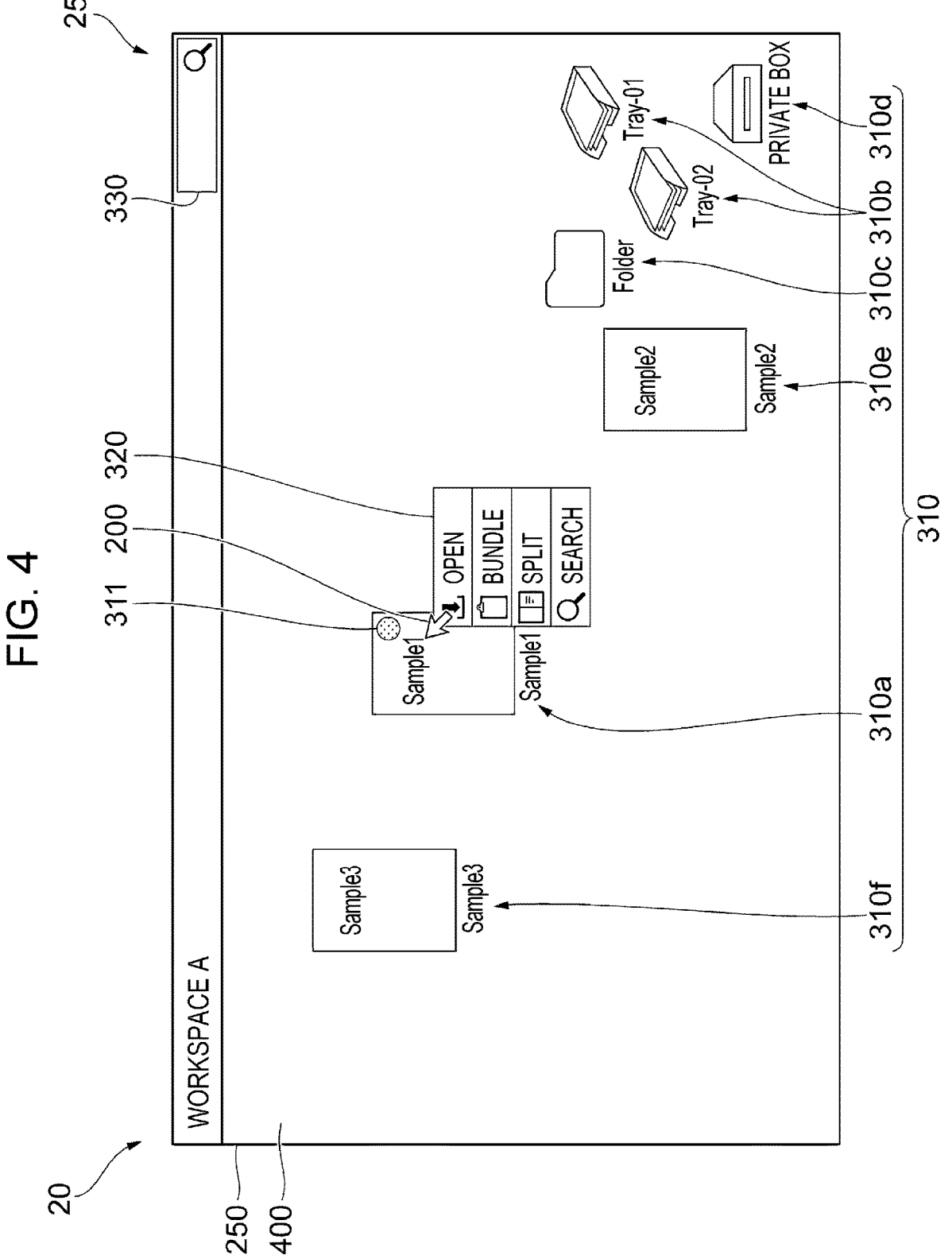
FIG. 4 is a diagram illustrating a display example on a display.

As illustrated in FIG. 4, in the exemplary embodiment, a display screen 250 displaying a workspace 400 of what is called file handling software is displayed on the display 25 provided in the terminal device 20.

The file handling software is software that manages electronically converted files and has a function of facilitating integrated management of paper and electronic documents.

Furthermore, the display 25 displays a cursor 200 that indicates the user operation location on the display 25.

The cursor 200, which is given as one example of a pointer image, moves according to mouse operations performed by the user.

The user moves the cursor 200 to a desired position on the display 25 and selects an element played on the display 25.

Also, in the exemplary embodiment, multiple icons 310 are displayed in the workspace 400 displayed on the display screen 250 of the display 25.

Furthermore, in the exemplary embodiment, an enlarge button image 311 for receiving an enlargement instruction from the user is displayed on some of the icons 310.

In the exemplary embodiment, if the user moves the cursor 200 onto an icon 310, the enlarge button image 311 is displayed on the icon 310. Also, in the exemplary embodiment, if the cursor 200 moves off the icon 310, the enlarge button image 311 is hidden.

Also, besides the icons 310, a context menu 320 and a search box 330 are displayed on the display screen 250 of the display 25.

The context menu 320 is an image for receiving instructions from the user. In the exemplary embodiment, the context menu 320 is displayed if a right-click is performed after positioning the cursor 200 over an icon 310, for example.

Selectable options are displayed in the context menu 320. In the exemplary embodiment, the user chooses an option from among the selectable options to thereby execute a process corresponding to the chosen option.

The search box 330 is an image for receiving a search from the user.

In the exemplary embodiment, a character string is inputted into the search box 330. If a character string is inputted into the search box 330, a search process using the inputted character string is executed with respect to the files in the workspace 400 displayed on the display screen 250 of the display 25, for example.

Note that the range of the search process is not limited to only the workspace 400 displayed on the display screen 250 of the display 25, and other workspaces 400 or all files stored in the server device 10 and the terminal device 20 may also be included in the range of the search process.

The icons 310 are images displayed on the display screen 250 of the display 25 in correspondence with each of user-selectable elements. A picture, symbol, character information, or the like is displayed in the icons 310. Each of the icons 310 may also be considered to be a thumbnail image.

In the display example illustrated in FIG. 4, a workspace A is displayed as the workspace 400, and multiple icons 310 are displayed in the workspace A.

In the exemplary embodiment, a first file icon 310*a*, a second file icon 310*e*, and a third file icon 310*f* respectively corresponding to files with the file names "Sample1", "Sample2", and "Sample3" are displayed as the icons 310.

Also, tray icons 310*b* respectively corresponding to trays with the tray names "Tray-01" and "Tray-02", a folder icon 310*c* corresponding to a folder, and a private box icon 310*d* corresponding to a private box are displayed in the workspace A.

Each of the first file icon 310*a*, second file icon 310*e*, and third file icon 310*f* given as examples of file images is an image that corresponds to and represents a file.

The first file icon 310*a*, second file con 310*e*, and third file icon 310*f* are configured as images that represent the content of a file using a picture, a symbol, or character information, for example.

In the case where the files corresponding to the first file icon 310*a*, second file icon 310*e*, and third file icon 310*f* contain image data, a reduced version of the image expressed by the image data is displayed as the file icon, for example.

As another example, in the case where the files corresponding to the first file icon 310*a*, second file icon 310*e*, and third file con 310*f* contain multi-page documents, a reduced version of an image on a representative page, such as first page, is displayed as the file icon, for example.

Additionally, the first file icon 310*a*, second file icon 310*e*, and third file icon 310*f* function as icons for opening the corresponding files.

The tray icons 310*b* are icons corresponding to tray that contain files, and when selecting a tray, the user selects the corresponding tray icon.

The folder icon 310*c* is an icon corresponding to a folder that contains files, and when selecting a folder, the user selects the folder icon.

The private box icon 310*d* is an icon provided to every user who operates the terminal device 20. In the exemplary embodiment, files provided by a third party to the user who operates the terminal device 20 are stored in an information storage area corresponding to the private box icon 310*d*. When referencing a file stored in the information storage area, the user selects the private box icon 310*d*.

The enlarge button image 311 is an image for receiving, from the user, an instruction related to the display of an enlarged image 360 described later. In FIG. 4, the enlarge button image 311 is displayed in association with the first file icon 310*a*.

The enlarge button image 311 displayed in FIG. 4 is an image for receiving, from the user, an instruction for displaying the enlarged image 360 (described later) corresponding to the first file icon 310*a* with the file name "Sample1".

As described later, in the exemplary embodiment, if the enlarge button image 311 is selected by the user, the enlarged image 360 (see FIG. 5) which corresponds to the first file icon 310*a* on which the enlarge button image 311 is displayed and which is an image having a larger display size than the first file icon 310*a* is displayed.

In the exemplary embodiment, an instruction for displaying the enlarged image 360 is received on the basis of a user operation performed on the enlarge button image 311 (see FIG. 4).

In the exemplary embodiment, if a click operation is performed on the enlarge button image 311, the operation is received as an operation for displaying the enlarged image 360.

Note that the enlarged image 360 may also be displayed if a mouseover operation is performed on the enlarge button image 311. In this case, the enlarged image 360 is hidden if the mouseover operation is no longer performed.

In the exemplary embodiment, the enlarge button image 311 is displayed in the upper-right corner of the first file icon 310*a*.

Also, in the exemplary embodiment, the display size of the enlarge button image 311 is smaller than the display size of the first file icon 310*a*.

Note that besides the above, the enlarge button image 311 may also be semitransparent such that the portion of the first file icon 310*a* that is positioned behind the enlarge button image 311 is visible through the enlarge button image 311.

In addition, the enlarge button image 311 may also be displayed in association with not only the first file icon 310*a* but also other icons, such as the second file icon 310*e*, the third file icon 310*f*, the tray icons 310*b*, the folder icon 310*c*, and the private box icon 310*d*.

In this case, the enlarged image 360 may be displayed with respect to the other icons, too.

Figure 5:
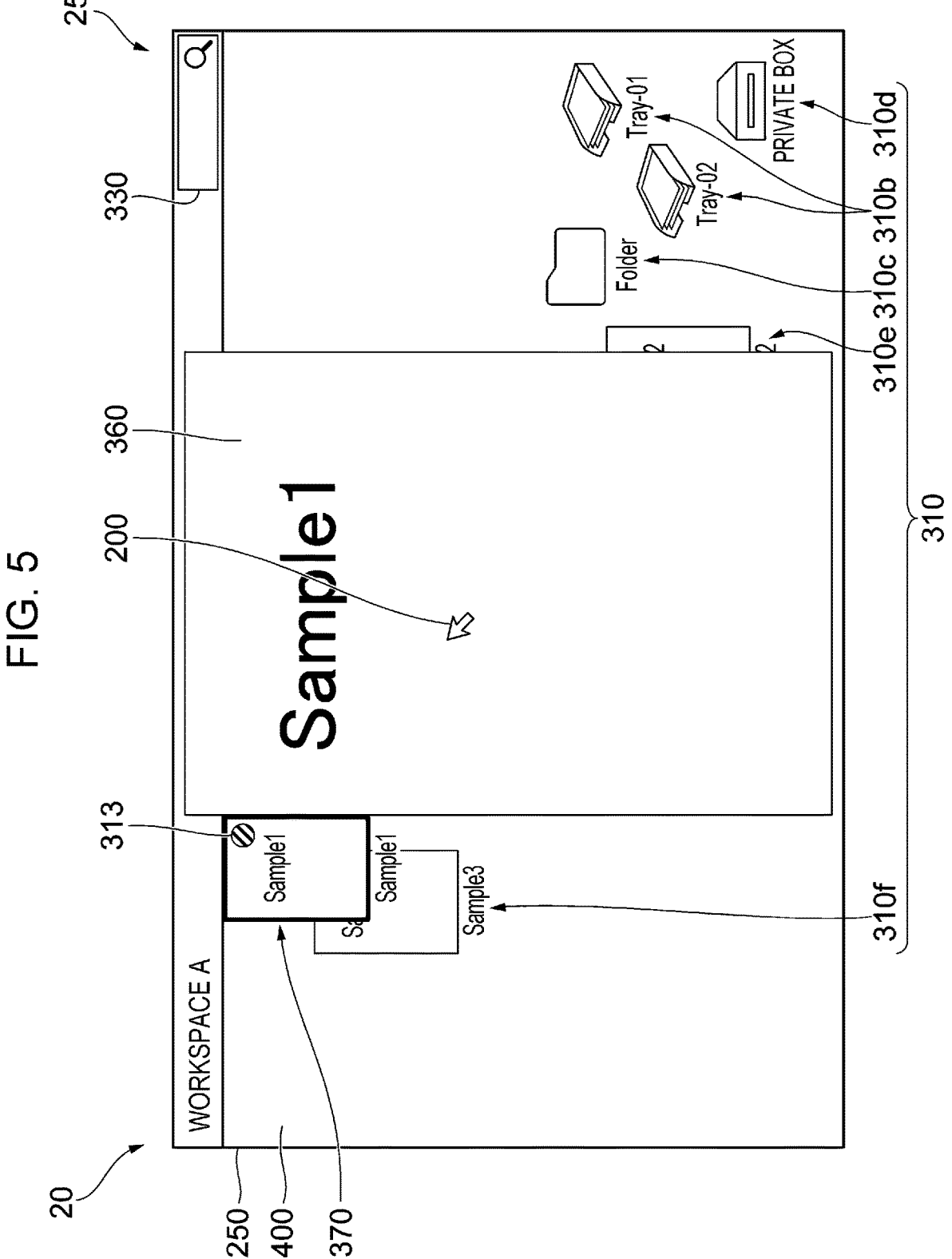
FIG. 5 is a diagram illustrating the state of a display after an enlarge button image of a first file icon is clicked.

FIG. 5 is a diagram illustrating the state of the display 25 after the enlarge button image 311 of the first file icon 310*a* is clicked.

In the exemplary embodiment, if the enlarge button image 311 (see FIG. 4) of the first file icon 310*a* is clicked, the enlarged image 360 corresponding to the first file icon 310*a* is displayed as described above.

As illustrated in FIG. 5, if the first file icon 310*a* (see FIG. 4) corresponding to "Sample1" is selected, the enlarged image 360 which corresponds to the first file icon 310*a* and which has a larger di play size than the first file icon 310*a* is displayed on the display 25.

More specifically, in the exemplary embodiment, if the enlarge button image 311 displayed in association with the first file icon 310*a* is clicked or the like, the enlarged image 360 having a larger display size than the first file icon 310*a* is displayed on the display 25.

Here, a "having a larger display size" is synonymous with having a larger display area. Note that hereinafter in this specification, "having a larger display size" similarly refers to having a larger display area. Also, "having a smaller display size" refers to having a smaller display area.

In the exemplary embodiment, the enlarged image 360 is displayed at a central position in the workspace 400 displayed on the display 25, and also at a higher level (toward the user) than the display level of the first file icon 310*a* from which the display of the enlarged image 360 originates.

As another example, in the case where the icon 310 from which the display of the enlarged image 360 originates is displayed at a position close to the edge of the workspace 400 displayed on the display 25, the enlarged image 360 may be displayed near the icon 310.

The enlarged image 360 may also be displayed in a location adjacent to the con 310. Also, with respect to the margins on each of the left and right sides of the icon 310, the enlarged image 360 may be displayed on the side with the larger margin.

In this way, in the exemplary embodiment, if the enlarge button image 311 of the first file icon 310*a* is clicked or the like, the enlarged image 360 corresponding to the first file icon 310*a* with the enlarge button image 311 displayed thereon is displayed.

In the exemplary embodiment, the shape of the first file icon 310*a* (see FIG. 4) and the shape of the enlarged image 360 are similar to each other.

Note that the configuration is not limited to an appearance like the above, and content different from the display content of the first file icon 310*a* may also be displayed in the enlarged image 360. Moreover, the shape of the enlarged image 360 and the shape of the first file icon 310*a* may be dissimilar to each other.

In the exemplary embodiment, the "enlarged image 360" refers to an image having a larger display size than the first file icon 310*a* given as one example of a file image. Even if an image has a different shape from the first file icon 310*a*, the image still corresponds to the enlarged image 360 if the image has a larger display size than the first file icon 310*a*.

Furthermore, in the exemplary embodiment, as illustrated in FIG. 5, if the user selects the first file icon 310*a*, a corresponding image 370 that corresponds to the first file icon 310*a* selected by the user is displayed.

Specifically, in the exemplary embodiment, when the enlarged image 360 is displayed, the corresponding image 370 is displayed to display information about the first file icon 310*a* selected by the user.

The corresponding image 370 given as one example of a file-corresponding image is an image that corresponds to the file represented by the first file icon 310*a* from which the display of the enlarged image 360 originates.

In the exemplary embodiment, a character image indicating the file name "Sample1" is displayed as a portion of the corresponding image 370.

The corresponding image 370 may be the same image as the first file icon 310*a* or an image in which at least one of the shape, display size, color, or content is different from the first file icon 310*a* Additionally, an image 371 (see FIG. 9) of a colored frame surrounding the corresponding image 370 may also be displayed.

In the exemplary embodiment, the corresponding image 370 is displayed in a different location from the location where the first file icon 310*a* (see FIG. 4) selected by the user was displayed. Here, "displayed in a different location" includes the case where at least a portion of the image is displayed in a different location. In other words, "displayed in a different location" also includes the case where a portion of the image is displayed in an overlapping way.

Also, the corresponding image 370 is displayed in a different location from the display area of the enlarged image 360. In the exemplary embodiment, the corresponding image 370 and the enlarged image 360 are displayed in a non-overlapping way, but the corresponding image 370 and the enlarged image 360 may also overlap partially.

In addition, an indication of an association between the corresponding image 370 and the enlarged image 360 may also be displayed.

Specifically, for example, the corresponding image 370 is displayed in a location having a predetermined positional relationship with the enlarged image 360.

In the case where the corresponding image 370 is displayed in a location having a predetermined positional relationship with the enlarged image 360, the corresponding image 370 is displayed in a location adjacent to the enlarged image 360, for example. In FIG. 5, the corresponding image 370 is displayed in an adjacent location to the left of the enlarged image 360. However, the configuration is not limited to the above, and the corresponding image 370 may also displayed in an adjacent location to the right of the enlarged image 360. Moreover, the corresponding image 370 may also be displayed in an adjacent location above or below the enlarged image 360.

Also, the indication of an association may be, for example, a line joining the corresponding image 370 and the enlarged image 360. The line may be straight or curved.

Otherwise, the indication of an association may be, for example, a display in which a shared color is applied to each of the corresponding image 370 and the enlarged image 360. In this case, it is preferable to display a frame surrounding the enlarged image 360 and a frame surrounding the corresponding image 370, and to set the color of the frames to a shared color.

Otherwise, the indication of an association may be a display of what is referred to as a balloon callout.

In the display example illustrated in FIG. 5, the corresponding image 370 is displayed at a higher level (toward the user) than the display level of the first file icon 310*a* (see FIG. 4) from which the display of the corresponding image 370 originates and the other icons 310 other than the first file icon 310*a*.

For other icons 310 that partially overlap with the enlarged image 360, the overlapping portions are displayed behind the enlarged image 360.

In the display example illustrated in FIG. 5, a cancel button image 313 for receiving, from the user, an instruction related to the display or the enlarged image 360 is additionally displayed.

The cancel button image 313 given as one example of a button image is displayed when the enlarged image 360 is displayed. The cancel button image 313 is displayed to receive, from the user, an instruction for canceling the display of the enlarged image 360. The cancel button image 313 is displayed instead of the enlarge button image 311 (see FIG. 4).

The cancel button image 313 is an image for receiving, from the user, an instruction for canceling the display of the enlarged image 360 corresponding to the first file icon 310*a* (see FIG. 4) with the file name "Sample1". In other words, the cancel button image 313 is an image for receiving, from the user, an instruction for hiding the enlarged image 360 corresponding to the first file icon 310*a* with the file name "Sample1".

Note that the cancel button image 313 may also be semitransparent such that the portion of the corresponding image 370 that is positioned behind the cancel button image 313 is visible through the cancel button image 313.

In the exemplary embodiment, if the user clicks the cancel button image 313, the display of the enlarged image 360 is canceled. In other words, in the exemplary embodiment, if the user clicks the cancel button image 313, the enlarged image 360 is hidden.

Specifically, if the user selects the cancel button image 313 from the state illustrated in FIG. 5, the display on the display 25 returns to the display illustrated in FIG. 4.

In the exemplary embodiment, if the enlarged image 360 is hidden, the corresponding image 370 is also hidden. In other words, in the exemplary embodiment, if the cancel button image 313 is clicked, the enlarged image 360 and the corresponding image 370 are hidden.

Also, in the exemplary embodiment, if the cancel button image 313 is clicked, the first file icon 310*a* (see FIG. 4) with the file name "Sample1" is displayed again.

FIG. 5 illustrates a case in which the corresponding image 370 is displayed in a different location from the display location of the first file con 310*a* selected by the user.

In this case, as illustrated in FIG. 5, the corresponding image 370 may overlap with another icon 310 other than the first file icon 310*a* in some situations.

Figure 6:
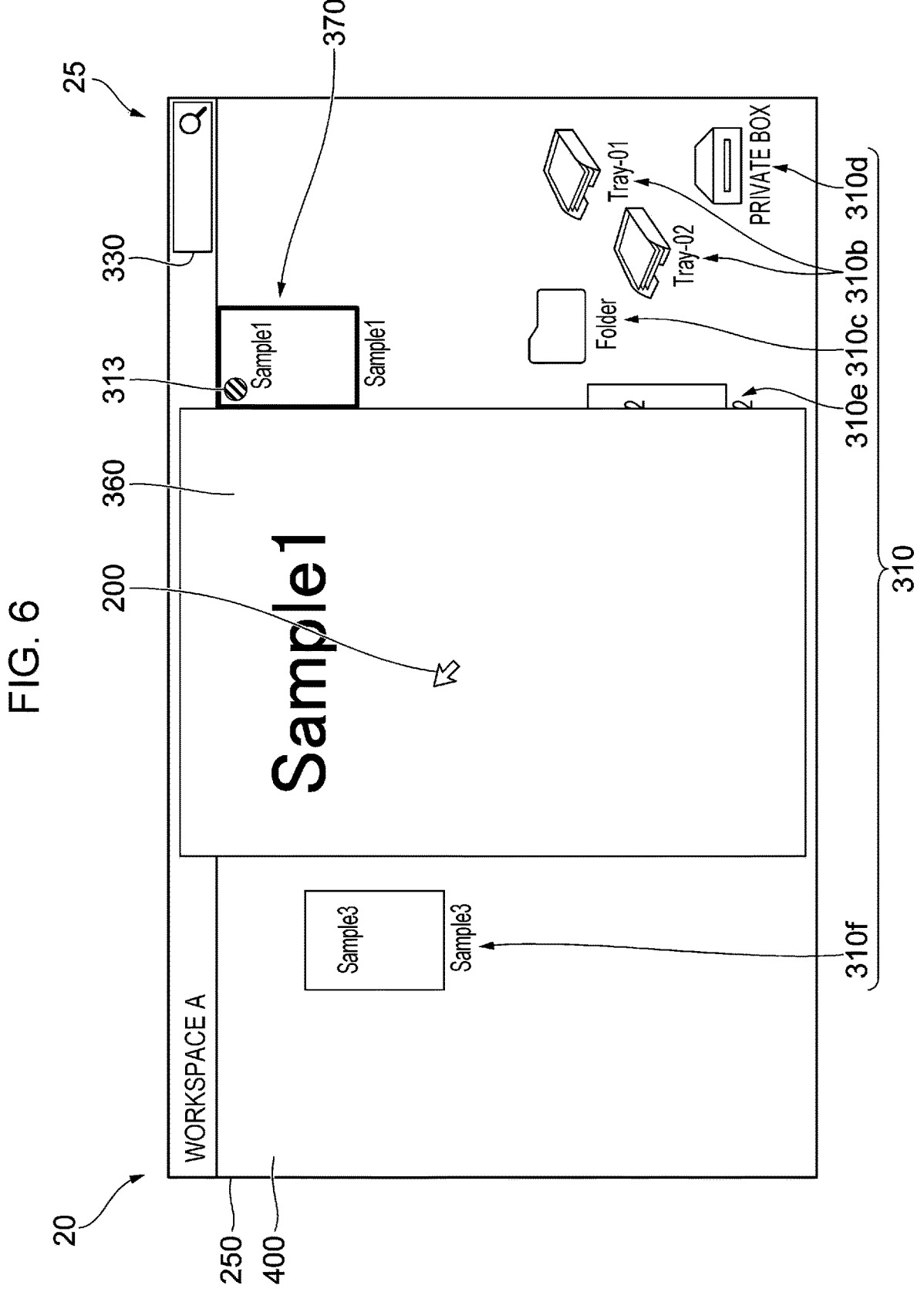
FIG. 6 is a diagram illustrating another display example on a display.

With regard to the display of the corresponding image 370, as illustrated in FIG. 6, the corresponding image 370 may also be displayed in a location that is different from the display location of the file icon 310*a* (see FIG. 4) and also different from the display locations of other icons 310 other than the first file icon 310*a*. In the display example in FIG. 6, the corresponding image 370 and the other icons 310 are displayed in a non-overlapping way.

Furthermore, the corresponding image 370 is not limited to being displayed in a location adjacent to the enlarged image 360 and may also be displayed in a specific location other than an adjacent location.

Figure 7:
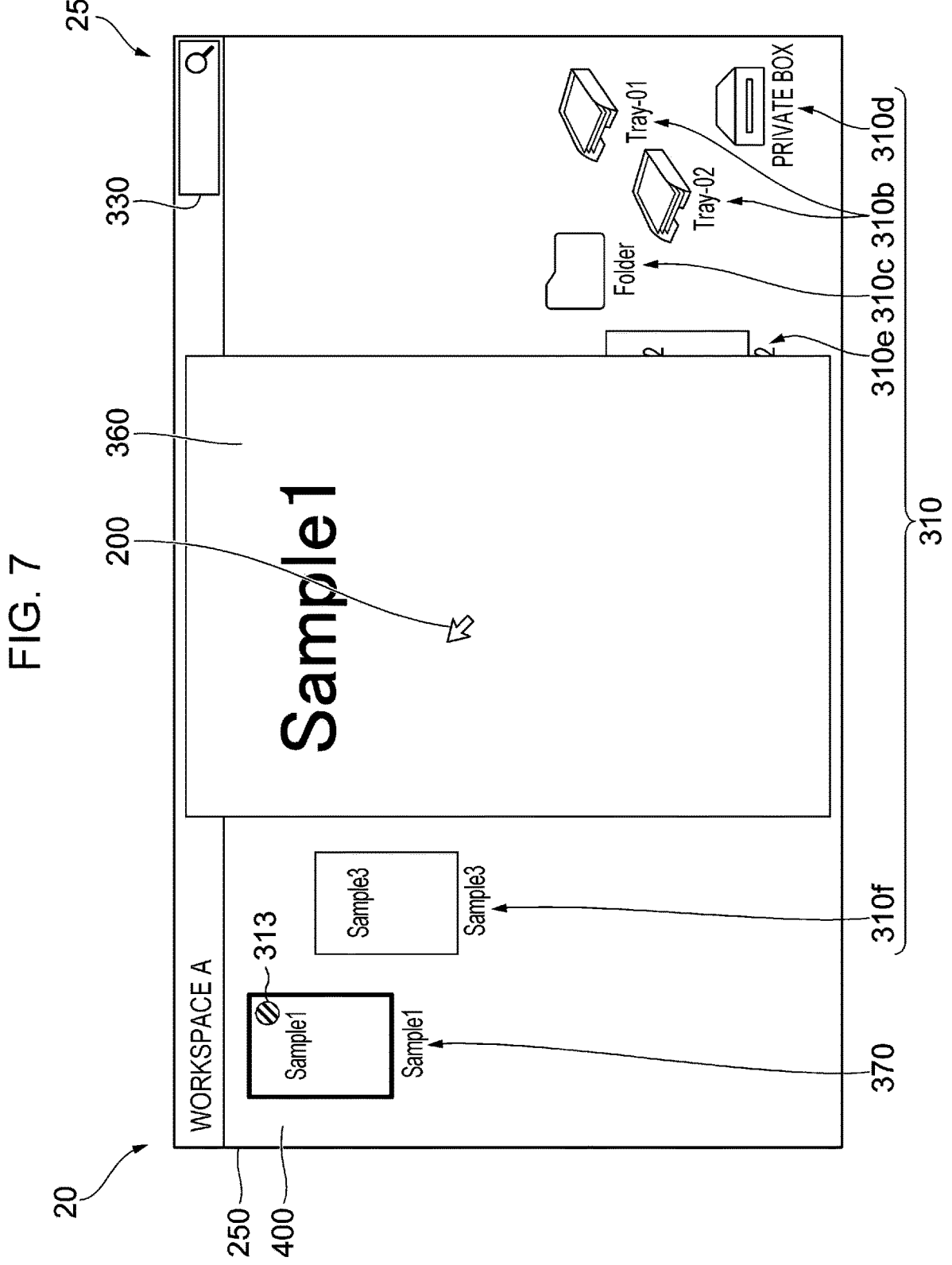
FIG. 7 is a diagram illustrating another display example on a display.

In the display example illustrated in FIG. 7, a specific location positioned near the left edge of the display screen 250 of the display 25 is the specific location where the corresponding image 370 is displayed.

In this case, the display location of the corresponding image 370 is predefined to be in a specific location. In the example illustrated in FIG. 5, the display location of the corresponding image 370 changes depending on the display location of the enlarged image 360, but in the example illustrated in FIG. 7, the corresponding image 370 is displayed in a predetermined, fixed location irrespective of the display location of the enlarged image 360.

If the corresponding image 370 is displayed in a predetermined, fixed location like the display example in FIG. 7, the user burden is lessened when the user looks for the corresponding image 370.

In the case where the corresponding image 370 is displayed in a predetermined, fixed location, the user simply has to look at the fixed location when looking for the corresponding image 370. In this case, the user burden is lessened compared to the case where the user looks around the enlarged image 360 to find the corresponding image 370.

The example described above is an example of a case where the corresponding image 370 corresponding to the first file icon 310a selected by the user is displayed if the first file icon 310a is positioned behind the enlarged image 360.

The configuration is not limited thereto, and the corresponding image 370 corresponding to an icon 310 selected by the user may also be displayed even if the icon 310 is not positioned behind the enlarged image 360.

Figure 8:
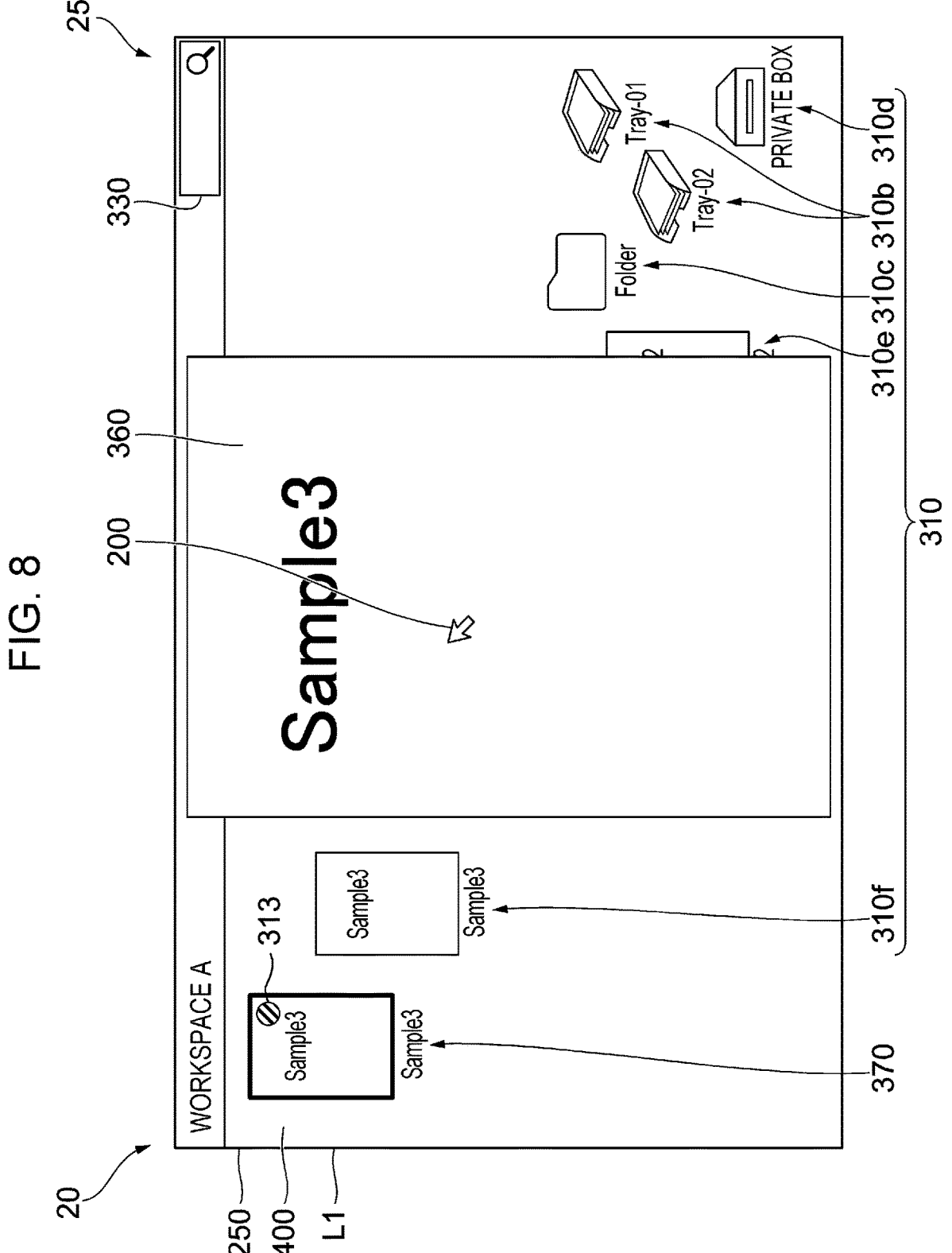
FIG. 8 is a diagram illustrating the state of a display on which an enlarged image corresponding to a third file icon is displayed.

FIG. 8 is a diagram illustrating a state of the display 25 on which the enlarged image 360 corresponding to the third file icon 310f is displayed.

In the display example illustrated in FIG. 8, the enlarged image 360 is displayed in relation to the third file icon 310f being selected by the user. In this display example, the third file icon 310f is not positioned behind the enlarged image 360.

Furthermore, in this display example, the corresponding image 370 corresponding to the third file icon 310f is displayed in relation to the third file icon 310f being selected by the user.

In this display example, the corresponding image 370 is additionally displayed in a state in which the third file icon 310f selected by the user not positioned behind the enlarged image 360 and the third file icon 310f is being displayed.

Note that the display of the third file icon 310f is not necessary, and the third file icon 310f may also be hidden when the corresponding image 370 is displayed.

In the display example illustrated in FIG. 8, the corresponding image 370 is likewise displayed in a predetermined, specific location. Specifically, in the display example, the corresponding image 370 is displayed near an edge L1 on the left side of the display screen 250 of the display 25.

In this case, too, the burden when the user looks for the corresponding image 370 is lessened for reasons similar to the above.

Figure 9:
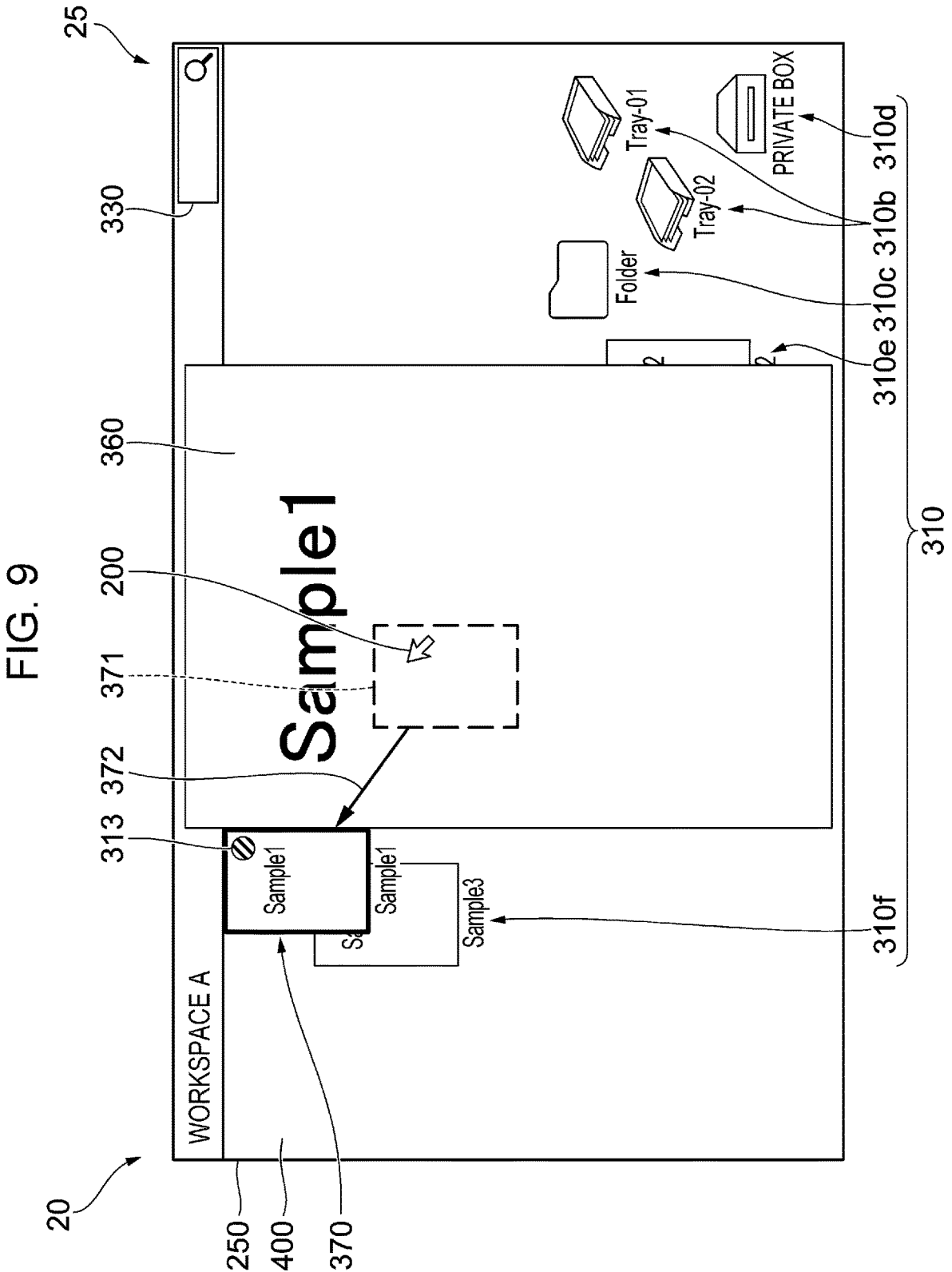
FIG. 9 is a diagram illustrating another display example on a display.

FIG. 9 is a diagram illustrating another display example on the display 25.

In the exemplary embodiment, as described above, if the enlarge button image 311 (see FIG. 4) of the first file icon 310a is clicked or the like, as illustrated in FIG. 9, the corresponding image 370 corresponding to the first file icon 310a with the enlarge button image 311 displayed thereon is displayed.

Furthermore, in the display example illustrated in FIG. 9, an image 371 is displayed.

The image 371 is an image for associating the location where the first file icon 310a (see FIG. 4) was displayed with the corresponding image 370.

In this display example, image 371 is displayed if the first file icon 310a selected by the user is positioned behind the enlarged image 360, the image 371 being a display for indicating the location where the first file icon 310a was displayed.

In this example, the image 371 contains frame lines indicating the outline of the first file icon 310a.

Also, in the display example illustrated in FIG. 9, an association indicator 372 that indicates an association between the image 371 and the corresponding image 370 is displayed.

Specifically, an arrow connecting the image 371 to the corresponding image 370 is displayed as the association indicator 372.

Note that besides the above, the association indicator may also be an animated display, for example.

With an animated display, the corresponding image 370 is displayed as moving from the display location of the image 371 toward the display location of the corresponding image 370, for example.

With this arrangement, a display informing the user that the image 371 and the corresponding image 370 are associated with each other is attained.

With regard to the display of the image 371, the image 371 and the association indicator 372 are displayed when the enlarged image 360 and the corresponding image 370 are displayed, for example.

Note that the image 371 and the association indicator 372 may be displayed temporarily when the corresponding image 370 is displayed, or may be displayed continually while the corresponding image 370 is displayed.

Otherwise, for example, the image 371 and the association indicator 372 may be displayed if a mouseover operation is performed on the corresponding image 370.

<Information to be Managed by Information Processing System>

FIG. 10 is a diagram illustrating an example of information managed by the information processing system 1.

FIG. 10 illustrates information to be recorded in the secondary storage 12, 22 as the information to be managed by the information processing system 1.

In the example illustrated in FIG. 10, for each file managed by the information processing system 1, a file identifier that identifies the file, a file name, and the position of the icon 310 corresponding to the file to be displayed in the workspace 400 are recorded in the secondary storage 12, 22. Also, for each file managed by the information processing system 1, the path to a thumbnail image to be used in the display of the icon 310, the path to an enlarged image to be used in the display of the enlarged image 360, and the path to a file to be used in the display of the actual file are recorded in the secondary storage 12, 22.

The information processing system 1 acquires the above information recorded in the secondary storage 12, 22 on the basis of a user operation, and information to be used to control the display on the display 25 provided in the terminal device 20 is generated. Thereafter, the terminal device 20 controls the display according to the generated information. With this arrangement, the various screens are displayed on the display 25 of the terminal device 20.

Also, in the exemplary embodiment, the information processing system 1 manages the path to a corresponding image to be used in the display of the corresponding image 370. Specifically, the information processing system 1 manages paths to corresponding images in units of files.

In the case of displaying the corresponding image 370, the information processing system 1 specifies the file for which the corresponding image 370 is to be displayed on the basis of the managed path to the corresponding image, and the corresponding image 370 corresponding to the specified file is displayed on the display 25.

<Flow of Processes>

Figure 11:
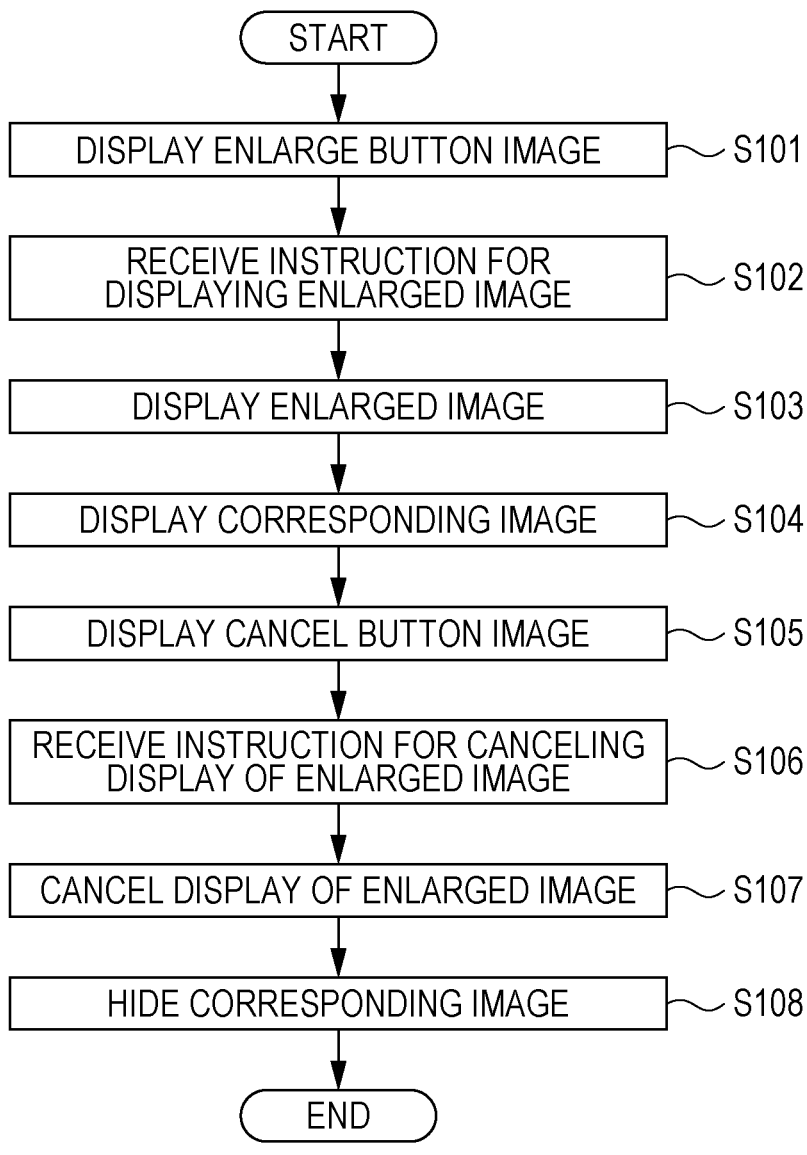
FIG. 11 is a flowchart illustrating a flow of processes executed when displaying an enlarged image and a corresponding image to which an exemplary embodiment is applied.

Next, a sequential flow of the processes described above will be described with reference to FIG. 11. Note that the following takes the example of a case where the user uses the input unit 24 such as a mouse to move the cursor 200, which is one example of a pointer image, over the display screen. Also, FIG. 11 illustrates the flow of processes for the case where the icon 310 from which the display of the enlarged image 360 originates is positioned behind the enlarged image 360.

In the exemplary embodiment, first, the terminal device 20 displays the enlarge button image 311 (see FIG. 4) on the basis of a user operation performed via the input unit 24 (step 101).

Specifically, the terminal device 20 determines whether the cursor 200 is positioned over the icon 310 (see FIG. 4), and displays the enlarge button image 311 if the cursor 200 is positioned over the icon 310.

Next, the terminal device 20 receives an instruction for displaying the enlarged image 360 (see FIG. 5) on the basis of a user operation performed via the input unit 24 (step 102).

Specifically, the terminal device 20 determines whether a user operation was performed on the enlarge button image 311, and receives the instruction for displaying the enlarged image 360 if there was an operation.

In response, the terminal device 20 displays the enlarged image 360 on the display 25 (step 103).

Specifically, the terminal device 20 displays the enlarged image 360 at a higher level than the display level of the icon 310 on which the enlarge button image 311 that was operated by the user was displayed. The icon 310 from which the display of the enlarged image 360 originates is positioned behind the enlarged image 360.

Also, the terminal device 20 displays the corresponding image 370 on the display 25 (step 104).

Specifically, the terminal device 20 displays the corresponding image 370 corresponding to the icon 310 from which the display of the enlarged image 360 originates in a location adjacent to the enlarged image 360.

Next, the terminal device 20 displays the cancel button image 313 (see FIG. 5) on the display 25 (step 105).

Next, in this process example, the terminal device 20 receives an instruction for canceling the display of the enlarged image 360 (step 106).

Specifically, the terminal device 20 receives a user operation performed on the cancel button image 313.

In response, the terminal device 20 cancels the display of the enlarged image 360 displayed on the display 25 (step 107). In other words, the terminal device 20 hides the enlarged image 360 displayed on the display 25.

Next, the terminal device 20 hides the corresponding image 370 (step 108).

This arrangement results in a state in which neither the enlarged image 360 nor the corresponding image 370 that were displayed on the basis of the user operation performed on the enlarge button image 311 are displayed.

Exemplary Modifications

The process example indicated above describes an example of a case where, if the user selects the enlarge button image 311 (see FIG. 4) on the first file icon 310*a*, the enlarged image 360 (see FIG. 5) is displayed and the corresponding image 370 corresponding to the first file icon 310*a* is also displayed.

However, the process in not limited thereto, and if the user selects the enlarge button image 311 on the first file icon 310*a*, the enlarged image 360 may be displayed together with multiple corresponding images 370.

In the case of displaying multiple corresponding images 370, the corresponding image 370 corresponding to the first file icon 310*a* from which the display of the enlarged image 360 originates is displayed together with corresponding images 370 corresponding to icons 310 from which the display of the enlarged image 360 does not originate, for example.

Figure 12:
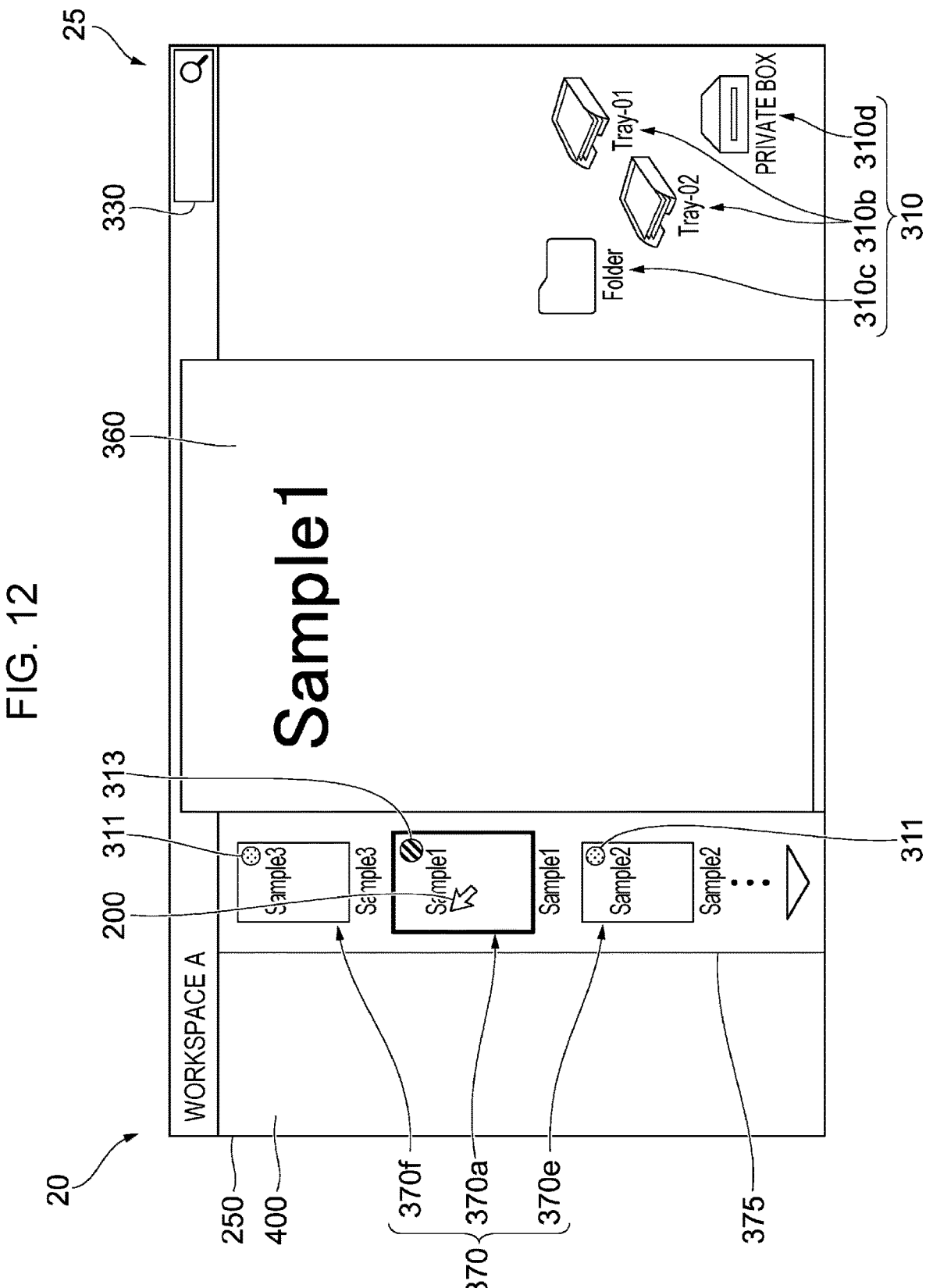
FIG. 12 is a diagram illustrating a display example on a display in the case where multiple corresponding images are displayed.

FIG. 12 is a diagram illustrating a display example on the display 25 in the case where multiple corresponding images 370 are displayed.

The display example in FIG. 12 is an example of a case where multiple corresponding images 370 (370*a*, 370*e*, 370*f*) are displayed in relation to the selection of the enlarge button image 311 on the first file icon 310*a*.

In FIG. 12, the first file icon 310*a* and the enlarge button image 311 are positioned behind the enlarged image 360 and are hidden.

In the display example illustrated in FIG. 12, the multiple corresponding images 370 are displayed in a corresponding image display area 375 extending in the vertical direction of the page in relation to the display of the enlarged image 360 corresponding to the first file icon 310*a*.

The corresponding image display area 375 given as one example of a specific area is a display area for displaying multiple corresponding images 370. The corresponding image display area 375 is displayed in a predetermined location on the display 25. Specifically, in the exemplary embodiment, the corresponding image display area 375 is displayed in an adjacent location to the left of the enlarged image 360.

In the exemplary embodiment, if the user clicks the enlarge button image 311 (see FIG. 4) on the first file icon 310*a* (not illustrated in FIG. 12) and causes the enlarged image 360 to be displayed, the corresponding image display area 375 is displayed in a location adjacent to the enlarged image 360.

Note that the corresponding image display area 375 may also be displayed in a location not adjacent to the enlarged image 360, and the display position of the corresponding image display area 375 is not particularly limited.

In the exemplary embodiment, when the enlarged image 360 is displayed, a situation may occur in which other icons 310 other than the icon 310 from which the display of the enlarged image 360 originates are positioned behind the enlarged image 360.

In this case, in the exemplary embodiment, corresponding images 370 corresponding to each of the other icons 310 are displayed in the corresponding image display area 375.

Note that the corresponding image display area 375 may also be displayed continually on the display 25.

In this case, if corresponding images 370 to be displayed do not exist, an empty corresponding image display area 375 is displayed. If corresponding images 370 to be displayed exist, the corresponding images 370 are displayed inside the corresponding image display area 375.

The appearance of the multiple corresponding images 370 is not limited to a vertical arrangement, and the multiple corresponding images 370 may also be arranged horizontally and displayed, for example.

Otherwise, if the number of corresponding images 370 displayed in the corresponding image display area 375 is equal to or greater than a threshold value, a scrollbar may be displayed to enable the user to refer to all of the corresponding images 370.

In the display example in FIG. 12, a corresponding image (hereinafter referred to as the "first corresponding image 370*a*") that corresponds to the first file icon 310*a* and a second corresponding image 370*e* and a third corresponding image 370*f* that correspond to other icons 310 are displayed.

Here, the third corresponding image 370*f* is a corresponding image that corresponds to an icon 310 obscured by the display of the corresponding image display area 375.

In some cases, an icon 310 may be positioned behind the corresponding image display area 375, and such cases, a corresponding image 370 corresponding to the icon 310 is displayed inside the corresponding image display area 375.

In the display example in FIG. 12, the first corresponding image 370*a*, the second corresponding image 370*e*, and the third corresponding image 370*f* are arranged in a line and displayed.

In the exemplary embodiment, the first corresponding image 370*a*, the second corresponding image 370*e*, and the third corresponding image 370*f* are displayed inside the corresponding image display area 375 in a non-overlapping way.

Note that the appearance of the display is not limited to the above, and for example, the first corresponding image 370*a*, the second corresponding image 370*e*, and the third corresponding image 370*f* may also be displayed in a partially overlapping way.

Also, in the display example in FIG. 12, the multiple corresponding images 370 are displayed in an order based on the locations where the icons 310 corresponding to each of the corresponding images 370 were displayed.

Figure 13:
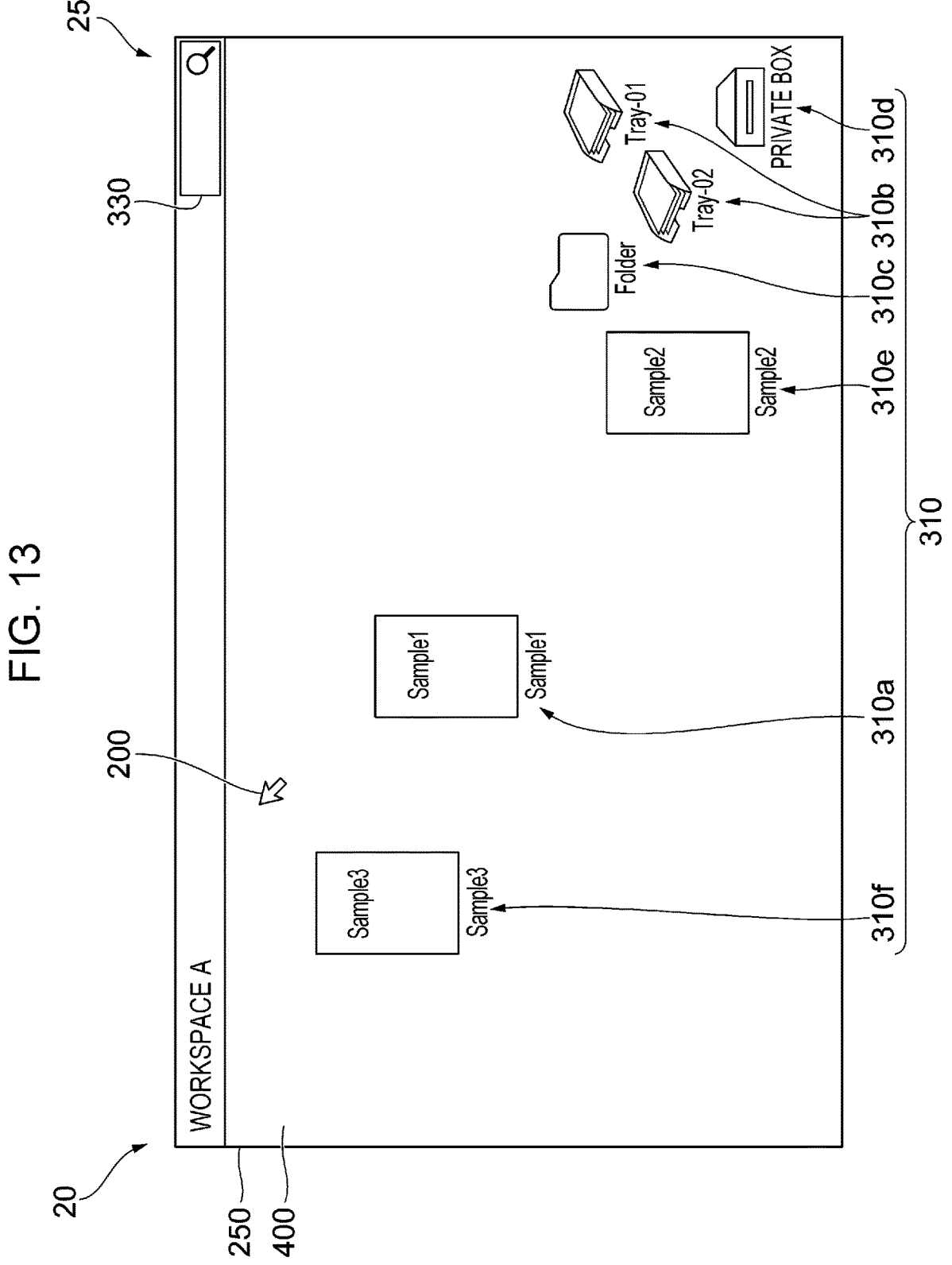
FIG. 13 is a diagram illustrating another display example on a display.

The state illustrated in FIG. 13 is the display state of the display screen 250 on the display 25 before the enlarged image 360 is displayed.

On the display screen 250 on the display 25 before the enlarged image 360 is displayed, the first file icon 310*a* is displayed in a central area, the second file icon 310*e* is displayed in a lower area, and the third file icon 310*f* is displayed in an upper area. In the exemplary embodiment, the display order of the third corresponding image 370*f*, the first corresponding image 370*a*, and the second corresponding image 370*e* is determined on the basis of the above locations where the icons 310 were displayed. In the exemplary embodiment, the corresponding images 370 are displayed in the order of the third corresponding image 370*f*, the first corresponding image 370*a*, and the second corresponding image 370*e* to match the display of the icons 310 in the order of the third file icon 310*f*, the first file icon 310*a*, and the second file icon 310*e*.

Also, in the exemplary embodiment, the appearance of the corresponding images 370 displayed inside the corresponding image display area 375 may also be differentiated between the first corresponding image 370*a* that corresponds to the enlarged image 360 being displayed, and the second corresponding image 370*e* and third corresponding image 370*f* that do not correspond to the enlarged image 360 being displayed.

In the display example in FIG. 12, the display size of the first corresponding image 370*a* that corresponds to the enlarged image 360 being displayed is larger than the display size of the second corresponding image 370*e* and the third corresponding image 370*f* that do not correspond to the enlarged image 360 being displayed.

Otherwise, for example, the first corresponding image 370*a* may be displayed in a blinking way while the second corresponding image 370*e* and the third corresponding image 370*f* may be displayed in a non-blinking way.

As another example, a color applied to the first corresponding image 370*a* may be different from a color applied to the second corresponding image 370*e* and the third corresponding image 370*f*.

Also, in the display example in FIG. 12, the cancel button image 313 is displayed on the first corresponding image 370*a* that corresponds to the enlarged image 360 being displayed, and the enlarge button image 311 is displayed on the second corresponding image 370*e* and the third corresponding image 370*f* that do not correspond to the enlarged image 360 being displayed.

In the exemplary embodiment, if the user selects a corresponding image 370 displayed inside the corresponding image display area 375, the enlarged image 360 corresponding to the corresponding image 370 is displayed.

Figure 14:
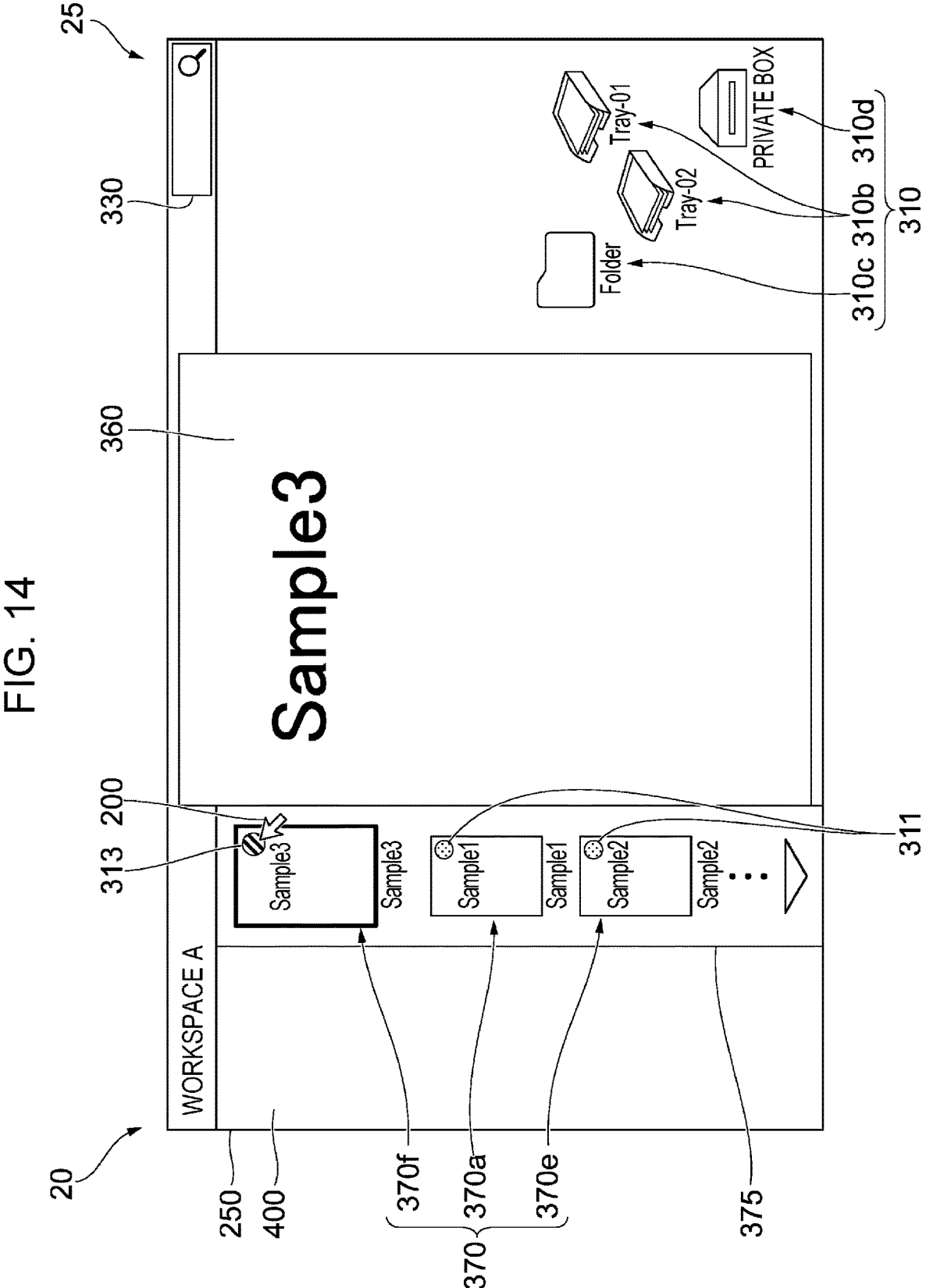
FIG. 14 is a diagram illustrating another display example on a display.

For example, if the user selects the enlarge button image 311 on the third corresponding image 370*f*, the enlarged image 360 corresponding to the first corresponding image 370*a* is hidden, and as illustrated in FIG. 14, the enlarged image 360 corresponding to the third corresponding image 370*f* is displayed.

In the display example illustrated in FIG. 14, the display size is reduced for the first corresponding image 370*a* that corresponds to the enlarged image 360 canceled from display. On the other hand, the display size is enlarged for the third corresponding image 370*f* from which the newly displayed enlarged image 360 originates.

In the display example illustrated in FIG. 14, the enlarge button image 311 is displayed on the first corresponding image 370*a* and the cancel button image 313 is displayed on the third corresponding image 370*f*.

Note that in FIGS. 12 and 14 illustrate a case where the enlarged image 360 corresponding to the first corresponding image 370*a* is hidden, but the enlarged image 360 corresponding to the first corresponding image 370*a* may also continue to be displayed without being hidden, and the enlarged image 360 corresponding to the third corresponding image 370*f* may be added to the display.

Figure 15:
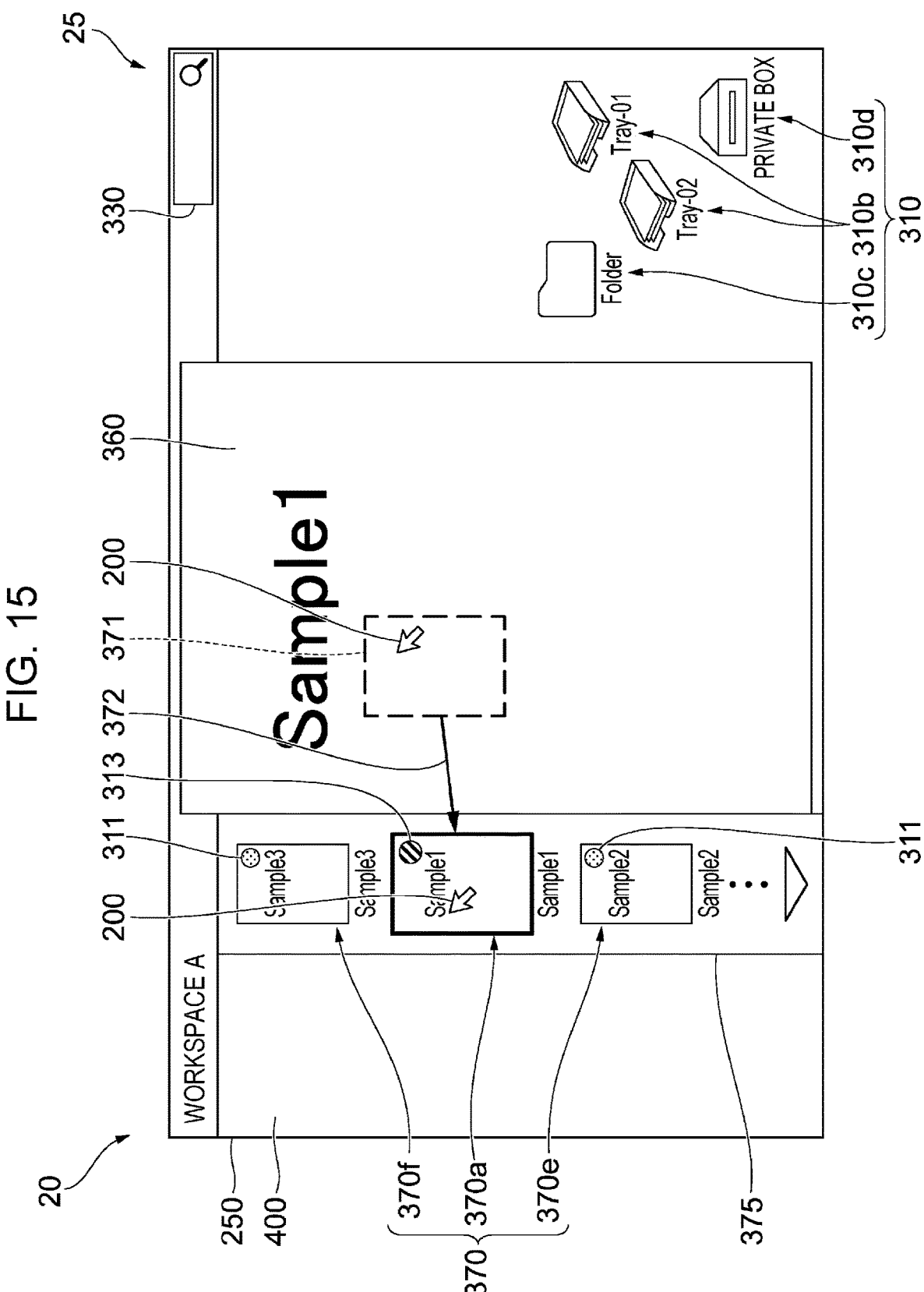
FIG. 15 is a diagram illustrating the state of a display when a mouseover is performed on a first corresponding image.

FIG. 15 is a diagram illustrating the state of the display 25 when a mouseover is performed on the first corresponding image 370*a*.

In the display example illustrated in FIG. 15, a mouseover is performed on the first corresponding image 370*a* and the first corresponding image 370*a* is selected by the user.

In this case, in the display example, an indication of an association between the first corresponding image 370*a* selected by the user and the first file icon 310*a* corresponding to the first corresponding image 370*a* is displayed.

More specifically, in this display example, the association indicator 372 that indicates an association between the image 371 indicating the location where the first file icon 310*a* was displayed and the first corresponding image 370*a* displayed.

<Flow of Processes>

Figure 16:
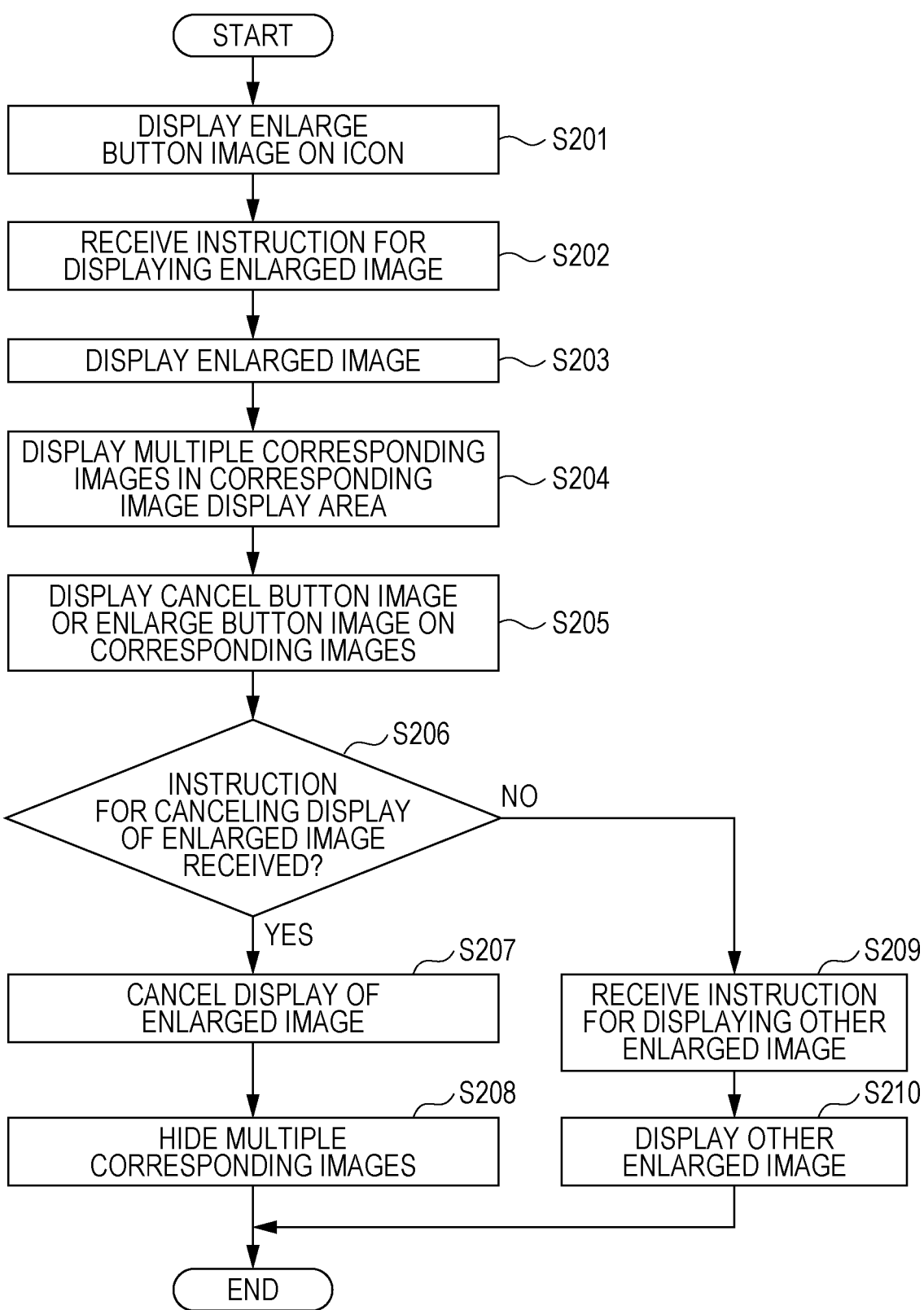
FIG. 16 is a flowchart illustrating a flow of processes executed when displaying an enlarged image and multiple corresponding images to which an exemplary embodiment is applied.

Next, a sequential flow of the processes according to the exemplary modifications described above will be described with reference to FIG. 16. Note that the following takes the example of a case where the user uses the input unit 24 such as a mouse to move the cursor 200, which is one example of a pointer image, over the display screen. Also, FIG. 16 illustrates the flow of processes for the case where the icon 310 from which the display of the enlarged image 360 originates is positioned behind the enlarged image 360.

In the exemplary embodiment, first, the terminal device 20 displays the enlarge button image 311 (see FIG. 4) on the icon 310 on the basis of a user operation performed via the input unit 24 (step 201).

Specifically, the terminal device 20 determines whether the cursor 200 is positioned over the icon 310 (see FIG. 4), and displays the enlarge button image 311 if the cursor 200 is positioned over the icon 310.

Next, the terminal device 20 receives an instruction for displaying the enlarged image 360 (see FIG. 7) on the basis of a user operation performed via the input unit 24 (step 202).

Specifically, the terminal device 20 determines whether a user operation was performed on the enlarge button image 311, and receives the instruction for displaying the enlarged image 360 if there was an operation.

In response, the terminal device 20 displays the enlarged image 360 on the display 25 (step 203).

Specifically, the terminal device 20 displays the enlarged image 360 at a higher level than the display level of the icon 310 on which the enlarge button image 311 that was operated by the user was displayed. The icon 310 from which the display of the enlarged image 360 originates is positioned behind the enlarged image 360.

Also, the terminal device 20 displays multiple corresponding images 370 in the corresponding image display area 375 (step 204).

Specifically, the terminal device 20 displays, in the corresponding image display area 375, the corresponding image 370 that corresponds to the icon 310 from which the display of the enlarged image 360 originates and the corresponding images 370 that correspond to the icons 310 from which the display of the enlarged image 360 does not originate and which are positioned behind the enlarged image 360 or the corresponding image display area 375.

Next, the terminal device 20 displays the cancel button image 313 or the enlarge button image 311 on the corresponding images 370 (step 205).

Specifically, the terminal device 20 displays the cancel button image 313 on the corresponding image 370 that corresponds to the enlarged image 360 being displayed, and displays the enlarge button image 311 on the corresponding images 370 that do not correspond to the enlarged image 360 being displayed.

Next, the terminal device 20 specifies whether an instruction for canceling the display of the enlarged image 360 was received (step 206).

Specifically, the terminal device 20 determines whether a user operation was performed with respect to the cancel button image 313 on the corresponding image 370, and specifies that an instruction for canceling the display of the enlarged image 360 was received if there was an operation.

If an instruction for canceling the display of the enlarged image 360 was received (S206, YES), the terminal device 20 cancels the display of the enlarged image 360 (step 207). In other words, if a user operation is performed on the cancel button image 313, the terminal device 20 hides the enlarged image 360.

Next, the terminal device 20 hides the multiple corresponding images 370 (step 208).

Specifically, the terminal device 20 hides the multiple corresponding images 370 and also hides the corresponding image display area 375.

On the other hand, if an instruction for canceling the display of the enlarged image 360 was not received (S206, NO), the flow proceeds to step 209. This process example assumes that in step 209, the terminal device 20 receives an instruction for displaying another enlarged image 360.

Specifically, the terminal device 20 determines whether a user operation was performed with respect to the enlarge button image 311 on a corresponding image 370, and specifies that an instruction for displaying the enlarged image 360 that corresponds to the corresponding image 370 with the enlarge button image 311 displayed thereon was received if there was an operation.

In response, the terminal device 20 displays the other enlarged image 360 on the display 25 (step 210).

Specifically, the terminal device 20 switches the display of the enlarged image 360 and displays the enlarged image 360 that corresponds to the corresponding image 370 on which the enlarge button image 311 was displayed.

The foregoing description of the exemplary embodiments or the present disclosure has been provided for the purposes of illustration and description. It is not intended to be exhaustive or to limit the disclosure to the precise forms disclosed. Obviously, many modifications and variations will be apparent to practitioners skilled in the art. The embodiments were chosen and described in order to best explain the principles or the disclosure and its practical applications, thereby enabling others skilled in the art to understand the disclosure for various embodiments and with the various modifications as are suited to the particular use contemplated. It is intended that the scope of the disclosure be defined by the following claims and their equivalents.

What is claimed is:

1. An information processing system comprising:
a processor configured to:
display a file image on a display, the file image being an image that is linked to a file and opens the file when a first operation is performed on the file image;
when a second operation is performed on the file image:
cause an enlarged image to be displayed on the display, the enlarged image being an enlarged version of the file image and having a larger display size than the file image; and
cause a file-corresponding image to be concurrently displayed with the enlarged image in a location different from a display location of the file image and a display location of the enlarged image, the file-corresponding image being a copy of the file image and being linked to the same file that is linked to the file image; and
when a third operation is performed in association with the file-corresponding image, cause both the enlarged image and the file-corresponding image to be hidden from the display.

2. The information processing system according to claim 1, wherein the processor is configured to cause the file-corresponding image to be displayed in a location having a predetermined positional relationship with the enlarged image.

3. The information processing system according to claim 2, wherein the processor is configured to cause the file-corresponding image to be displayed in a location adjacent to the enlarged image.

4. The information processing system according to claim 1, wherein the processor is configured to cause the file-corresponding image to be displayed in a location different from the display location of the file image and different from a display location of another file image other than the selected file image.

5. The information processing system according to claim 1, wherein the processor is configured to cause the file-corresponding image to be displayed without overlapping a display area of the enlarged image.

6. The information processing system according to claim 1, wherein the processor is configured to cause the file-corresponding image to be displayed if when the file image is positioned behind the enlarged image.

7. The information processing system according to claim 1, wherein the processor is configured to additionally cause the file-corresponding image to be displayed while the file image is being displayed on the display.

8. The information processing system according to claim 7, wherein the processor is configured to cause the file-corresponding image to be displayed in a predetermined, specific location within a display screen displayed on the display.

9. The information processing system according to claim 1, wherein the processor is configured to cause an indication indicating a position where the file image had been displayed to be displayed when the file image is positioned behind the enlarged image upon the second operation being performed on the file image.

10. The information processing system according to claim 9, wherein the processor is configured to cause the indication to be displayed when the file-corresponding image is selected in a state in which the file image is positioned behind the enlarged image.

11. The information processing system according to claim 1, wherein the processor is configured to cause an indication of an association between the file image and the file-corresponding image to be displayed.

12. The information processing system according to claim 11, wherein the processor is configured to cause the indication of the association between the file image and the file-corresponding image to be displayed when the file-corresponding image is displayed.

13. The information processing system according to claim 1, wherein the processor is configured to:
cause the file-corresponding image to be displayed inside a specific area of a display screen displayed on the display; and
cause another file image other than the file image to also be displayed inside the specific area.

14. The information processing system according to claim 13, wherein the processor is configured to cause at least the other file image which is positioned behind the enlarged image to be displayed inside the specific area.

15. The information processing system according to claim 13, wherein the processor is configured to:
cause the specific area to be displayed in a predetermined location of the display screen when the second operation is performed on the file image; and
cause the other file image which had been displayed in the predetermined location before the specific area is displayed to be displayed inside the specific area.

16. The information processing system according to claim 1, wherein the processor is configured to:
cause the file-corresponding image to be displayed inside a specific area of a display screen displayed on the display;
cause another file image other than the file image to also be displayed inside the specific area; and
cause, when the other file image being displayed inside the specific area is selected, another enlarged image corresponding to the other file image to be displayed.

17. The information processing system according to claim 16, wherein:
when the file-corresponding image and the other file image are displayed inside the specific area, a plurality of images corresponding to files are displayed inside the specific area; and
the processor is configured to differentiate an appearance of an image for which the enlarged image is being displayed from an appearance of another image for which the enlarged image is not being displayed among the plurality of images inside the specific area.

18. An information processing method comprising:
displaying a file image on a display, the file image being an image that is linked to a file and opens the file when a first operation is performed on the file image;
when a second operation is performed on the file image:
 causing an enlarged image to be displayed on the display, the enlarged image being an enlarged version of the file image and having a larger display size than the file image; and
 causing a file-corresponding image to be concurrently displayed with the enlarged image in a location different from a display location of the file image and a display location of the enlarged image, the file-corresponding image being a copy of the file image and being linked to the same file that is linked to the file image; and
when a third operation is performed in association with the file-corresponding image, cause both the enlarged image and the file-corresponding image to be hidden from the display.

19. A non-transitory computer readable medium storing a program causing a computer to execute a process comprising:
displaying a file image on a display, the file image being an image that is linked to a file and opens the file when a first operation is performed on the file image;
when a second operation is performed on the file image:
 causing an enlarged image to be displayed on the display, the enlarged image being an enlarged version of the file image and having a larger display size than the file image; and
 causing a file-corresponding image to be concurrently displayed with the enlarged image in a location different from a display location of the file image and a display location of the enlarged image, the file-corresponding image being a copy of the file image and being linked to the same file that is linked to the file image; and
when a third operation is performed in association with the file-corresponding image, cause both the enlarged image and the file-corresponding image to be hidden from the display.

* * * * *